US009485725B2

(12) United States Patent
Yaacoub

(10) Patent No.: US 9,485,725 B2
(45) Date of Patent: Nov. 1, 2016

(54) METHODS AND SYSTEM FOR DYNAMICALLY SWITCHING OFF/ON OF BASE STATIONS

(71) Applicant: QATAR UNIVERSITY QSTP-B, Doha (QA)

(72) Inventor: Elias Yaacoub, Doha (QA)

(73) Assignee: QATAR UNIVERSITY QSTP-B, Doha (QA)

( * ) Notice: Subject to any disclaimer, the term of this patent is extended or adjusted under 35 U.S.C. 154(b) by 231 days.

(21) Appl. No.: 14/314,055

(22) Filed: Jun. 25, 2014

(65) Prior Publication Data
US 2015/0382290 A1    Dec. 31, 2015

(51) Int. Cl.
*H04W 52/02* (2009.01)
*H04W 24/02* (2009.01)
*H04W 36/16* (2009.01)
*H04W 24/10* (2009.01)
*H04W 16/08* (2009.01)
*H04W 92/20* (2009.01)
*H04W 36/22* (2009.01)
*H04W 16/10* (2009.01)
*H04L 5/00* (2006.01)
*H04W 40/00* (2009.01)
*H04W 36/00* (2009.01)
*H04W 72/04* (2009.01)
*H04W 24/08* (2009.01)
*H04W 28/16* (2009.01)
*H04W 84/04* (2009.01)
*H04W 52/40* (2009.01)

(52) U.S. Cl.
CPC ......... *H04W 52/0206* (2013.01); *H04W 24/02* (2013.01); *H04W 36/165* (2013.01); *H04L 5/0035* (2013.01); *H04L 5/0037* (2013.01); *H04L 5/0094* (2013.01); *H04W 16/08* (2013.01); *H04W 16/10* (2013.01); *H04W 24/08* (2013.01); *H04W 24/10* (2013.01); *H04W 28/16* (2013.01); *H04W 36/0033* (2013.01); *H04W 36/22* (2013.01); *H04W 40/005* (2013.01); *H04W 52/0235* (2013.01); *H04W 52/40* (2013.01); *H04W 72/042* (2013.01); *H04W 72/0426* (2013.01); *H04W 84/045* (2013.01); *H04W 92/20* (2013.01)

(58) Field of Classification Search
None
See application file for complete search history.

(56) References Cited

U.S. PATENT DOCUMENTS 9,300,459 B2 * 3/2016 Lee ................. H04W 56/0045
2005/0288023 A1 * 12/2005 Kim ................. H04W 36/0005
455/439

(Continued)

*Primary Examiner* — Andrew Oh

(57) ABSTRACT

Disclosed are methods and system for dynamically switching at least a base station in ON/OFF mode in a cellular network. The method comprises: determining traffic load information of BSs; exchanging the traffic load information between BSs; determining at least a preferred BS for one of a switched OFF mode and a switched ON mode. The system comprises: at least a coverage BS with a master controller; at least a capacity BS with a slave controller adapted to be in one of the switched ON mode and the switched OFF mode depending on network conditions and to satisfy cellular traffic loads, and at least a communication interface adapted to provide interface between at least the coverage BS and the capacity BS.

19 Claims, 19 Drawing Sheets (a)

(b)

(c)

(56) References Cited

U.S. PATENT DOCUMENTS

| | | | |
|---|---|---|---|
| 2011/0044272 A1* | 2/2011 | Cui | H04B 7/0452 370/329 |
| 2012/0008596 A1* | 1/2012 | Jung | H04W 36/0033 370/331 |
| 2012/0165063 A1* | 6/2012 | Scalia | H04W 52/343 455/522 |
| 2012/0282934 A1* | 11/2012 | Simonsson | H04W 72/12 455/446 |
| 2013/0017852 A1* | 1/2013 | Liu | H04W 88/085 455/509 |
| 2013/0040625 A1* | 2/2013 | Godin | H04W 16/08 455/418 |
| 2013/0223272 A1* | 8/2013 | Tao | H04B 7/024 370/252 |
| 2014/0004870 A1* | 1/2014 | Alberi-Morel | H04B 7/022 455/452.1 |
| 2014/0011543 A1* | 1/2014 | Li | H04W 52/0206 455/561 |
| 2014/0247744 A1* | 9/2014 | Agiwal | H04W 28/16 370/252 |
| 2014/0269632 A1* | 9/2014 | Blankenship | H04W 76/025 370/336 |
| 2014/0313915 A1* | 10/2014 | Lee | H04B 7/024 370/252 |
| 2015/0146692 A1* | 5/2015 | Yi | H04W 36/0055 370/331 |
| 2015/0189516 A1* | 7/2015 | Seo | H04L 5/001 370/329 |
| 2015/0208361 A1* | 7/2015 | Kim | H04W 52/146 455/522 |
| 2015/0222399 A1* | 8/2015 | Cheng | H04L 5/0035 370/329 |
| 2015/0245270 A1* | 8/2015 | Wu | H04W 36/22 370/331 |
| 2015/0319688 A1* | 11/2015 | Matas Sanz | H04W 52/0206 455/574 |
| 2015/0358869 A1* | 12/2015 | Byun | H04W 36/08 370/331 |
| 2015/0373559 A1* | 12/2015 | Hong | H04W 16/32 370/329 |
| 2016/0007211 A1* | 1/2016 | Mochizuki | H04W 16/08 455/449 |
| 2016/0044576 A1* | 2/2016 | Hahn | H04W 52/0206 455/434 |
| 2016/0066356 A1* | 3/2016 | Lindoff | H04W 52/383 370/329 |

* cited by examiner

METHODS AND SYSTEM FOR DYNAMICALLY SWITCHING OFF/ON OF BASE STATIONS

FIELD OF THE INVENTION

The present invention relates to wireless communication network, and more particularly to system and methods for dynamically switching ON/OFF base stations in cellular communication networks in efficient, secure, and environment friendly manner.

BACKGROUND OF THE INVENTION

The explosion in rich media content, such as audio, video and gaming, is significantly increasing the load on cellular systems. State-of-the-art and next generation cellular systems have to cope with the mobile data growth. The number of cells required to meet the capacity demands is expected to increase significantly. Solutions to meet the increasing demand include the deployment of heterogeneous networks (HetNets) involving macrocells and small cells (picocells, femtocells, etc.), distributed antenna systems (DAS), coordinated multi point (CoMP) communication, relay stations (RS), and the use of device-to-device (D2D) communications. In fact, HetNets are expected to constitute a paradigm shift in state-of-the-art cellular networks, and they constitute an interesting solution for network densification, which is a main theme for the evolution of cellular networks into the fifth generation (5G).

On the other hand, energy efficiency is representing an increasing concern for cellular network operators. Naturally, the main motivation is to minimize their electricity costs and maintain profitability. Nevertheless, reducing $CO_2$ emissions and other negative impacts on the environment such as electromagnetic radiation pollution are also important objectives. In fact, a large portion of the energy dissipated in a cellular system is actually consumed at the base stations (BSs).

Further, operating a dense HetNet in an energy-efficient manner with minimized energy consumption is a challenging task. Typically in a HetNet, macrocell BSs (MBSs) cover areas that are relatively large, and coexist with small cell BSs (SCBSs) covering smaller areas and thus providing network access points (APs) at closer proximity to the users in order to enhance the capacity and achievable data rates and meet the quality of service (QoS) requirements.

The conventional techniques addressing BS on/off switching, assume that there is a sort of centralized entity in the network that controls the on/off switching of BSs. In addition, the conventional techniques consider an exchange of information between the BSs and/or the UEs with the network that is beyond the existing standards in state-of-the-art cellular networks. The conventional methods focuses on switching off BSs and fail to disclose any efficient technique for switching BSs on.

In view of the drawbacks inherent in the prior art, there exists a need of a low complexity, efficient, and distributed approach that allows dynamically switching BSs on/off according to traffic load conditions without centralized control from a central entity in the network to save energy in wireless networks.

SUMMARY OF THE INVENTION

In view of the foregoing disadvantages inherent in the prior-art, the general purpose of the present invention is to provide methods and system for dynamically switching ON/OFF at least a base station in a cellular network that is configured to include advantages of the prior art and to overcome the drawbacks inherent in the prior art offering some added advantages.

In one aspect the present invention provides a method for dynamically switching at least a base station in ON/OFF mode in a cellular network. The method comprises: determining traffic load information of at least a capacity BS and at least a coverage BS; exchanging the traffic load information with at least a neighboring coverage BS and at least a neighboring capacity BS; determining at least a preferred capacity BS for one of a switched OFF mode and a switched ON mode, wherein the preferred capacity BS is one of the capacity BS and a neighboring capacity BS corresponding to the coverage BS; and switching the preferred capacity BS in to one of the switched OFF mode and the switched ON mode. Coordinated multipoint (CoMP) information with at least one of the coverage BS, the capacity BS, and the neighboring coverage BS is used to determine the preferred capacity BS to be switched ON, wherein the coverage BSs are always active or in switched ON mode.

In another aspect, the present invention provides a determining method which is implemented at at least the coverage BS to determining at least the preferred capacity BS for switching OFF mode, comprises: exchanging traffic load information between at least the coverage BS, the capacity BS, the neighboring coverage BS, and the neighboring capacity BS through a communication interface; determining at least the preferred capacity BS whose traffic load is decreased beyond a certain threshold; and switching at least the preferred capacity BS in the switched OFF mode.

In yet another aspect of the present invention, switching method which is implemented at at least the capacity BS for switching at least the preferred capacity BS for switching OFF mode, comprises: exchanging traffic load information between at least the coverage BS, the capacity BS, the neighboring coverage BS, and the neighboring capacity BS; receiving at least a switched OFF mode request from the coverage BS; attempting to handover the user equipment to at least one of the neighboring coverage BS and the neighboring capacity BS; sending handover preparation information to at least one of the neighboring coverage BS and the neighboring capacity BS; checking whether all the handover requests are accepted by at least one of the neighboring coverage BS and the neighboring capacity BS; sending handover cancellation requests to at least one of the neighboring coverage BS and the neighboring capacity BS to cancel the prepared handovers if at least one handover request is rejected; informing the coverage BS of the failure of the switch OFF mode process and continuing operation normally; executing systematically the prepared handovers if all handover requests are accepted; canceling the remaining prepared handovers and informing the coverage BS of the failure of the switch OFF mode process in case if at least one handover fails; and sending the capacity BS into switched OFF mode after informing the coverage BS of the success of the operation if all the prepared handovers are successfully completed.

In yet another aspect of the present invention, the determining method which is implemented at the coverage BS for determining at least the preferred capacity BS for switching ON mode, comprises: exchanging traffic load information over the communication interface between a plurality of active BSs during normal network operation; determining at least an active BS of which a traffic load is increased beyond a certain threshold or if the active BS itself supporting a load beyond a certain threshold; checking records of the coverage BS to determine if it has set at least one capacity BS into switched OFF mode in case a load increased beyond target thresholds; sending at least a wake-up signal to at least the capacity BS for switching the capacity BS in switched ON mode; determining at least the a preferred capacity BS for switched ON mode if a plurality of capacity BSs are in switched OFF mode; sending a wake up signal to at least the capacity BS after determining the capacity BS to be in switched ON mode; and implementing a BS selection method for selecting at least the preferred capacity BS for switched ON mode.

In yet another aspect of the present invention, the BS selection method is implemented at at least the coverage BS comprises: determining number of user equipments that are served using coordinated multipoint (CoMP) or that are coordinated multipoint (CoMP) candidates; determining a plurality of active BSs that are jointly serving the user equipments with the coverage BS using the CoMP, determining a group of active BSs serving a largest number of user equipments using the CoMP among a previous set of active BSs, wherein at least the coverage BS is a member of the group; determining at least a capacity BS within coverage of the coverage BS that is in switched OFF mode and that has a smallest average distance to the active BSs of the group; and selecting at least the capacity BS to be in switched ON mode. Ties are resolved arbitrarily in case a plurality of capacity BS are in switched OFF mode have the same average distance to the most loaded CoMP group BSs.

In yet another aspect of the present invention, the switching method for switching the capacity BS in switched ON mode is implemented at capacity BS comprises: receiving switched ON signal from the coverage BS; attempting to send at least the capacity BS in the switched ON mode; sending an indication to the coverage BS indicating a failure of the switched ON mode operation and to remain in switched OFF mode if the process of attempting to send at least the capacity BS in the switched ON mode fails; starting operation of the capacity BS if the process of attempting to send at least the capacity BS in the switched ON mode is successful; serving user equipments within range of the capacity BS which is in the switched ON mode; communicating with at least one of the neighboring capacity BS and the coverage BS for handover preparation for the user equipments that the switched ON mode capacity BS may serve; and executing handovers of the user equipments in coordination with at least one of the neighboring coverage BS and the capacity BS.

In one aspect, the present invention provides a system for dynamically switching ON/OFF at least a base station in a cellular network. The system comprises: at least a coverage BS adapted in switched ON mode for ensuring uninterrupted cellular coverage over a given area; at least a capacity BS adapted to be in one of the switched ON mode and the switched OFF mode depending on network conditions and to satisfy cellular traffic loads, and at least a communication interface adapted to provide interface between at least the coverage BS and the capacity BS. The coverage BS comprises a master controller incorporating at least a determining module for determining at least a preferred capacity BS for one of a switched OFF mode and a switched ON mode. The capacity BS comprises: a slave controller incorporating at least a switching module for dynamically switching at least the preferred capacity BS into one of the switched OFF mode and the switched ON mode.

These together with other aspects of the invention, along with the various features of novelty that characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there are illustrated exemplary embodiments of the invention.

BRIEF DESCRIPTION OF DRAWINGS

While the specification concludes with claims that particularly point out and distinctly claim the invention, it is believed that the advantages and features of the present invention will become better understood with reference to the following more detailed description of expressly disclosed exemplary embodiments taken in conjunction with the accompanying drawings. The drawings and detailed description which follow are intended to be merely illustrative of the expressly disclosed exemplary embodiments and are not intended to limit the scope of the present invention as set forth in the appended claims. In the drawings:

DETAILED DESCRIPTION OF THE INVENTION

The exemplary embodiments described herein in detail for illustrative purposes are subject to many variations in structure and design. It should be emphasized, however, that the present invention is not limited to a particular system and methods for dynamically switching ON/OFF at least a base station in a cellular network as shown and described. It is understood that various omissions and substitutions of equivalents are contemplated as circumstances may suggest or render expedient, but these are intended to cover the application or implementation without departing from the spirit or scope of the claims of the present invention. Also, it is to be understood that the phraseology and terminology used herein is for the purpose of description and should not be regarded as limiting.

The use of terms "including", "comprising" or "having" and variations thereof herein are meant to encompass the items listed thereafter and equivalents thereof as well as additional items. The terms, "a" and "an" herein do not denote a limitation of quantity, but rather denote the presence of at least one of the referenced item. Further, the term "plurality" herein denotes the presence of more than one of the referenced item.

The terminologies herein after referred to as, resource block(s) for "RB(s)"', base station(s) for "BS(s)", macrocell base station(s) for "MBS(s)", small cell base station(s) for "SCBS(s)", heterogeneous network(s) for "HetNet", active for "switched ON" or "switched ON mode" or "switch on" "waked-up" or "waked-up mode" or "ON" or "on" "ON state", sleep mode also referred to as "switched OFF mode" "switch off" or "OFF" or "of" or "OFF state" or "sleep", coordinated multipoint for "CoMP".

The present invention provides system and methods for dynamically switching BSs ON/OFF without centralized control from a central entity, for example, a centralized network management entity in the network, in a low complexity, distributed, cost effective, and environment friendly manner.

The present invention achieves energy efficiency in cellular networks by providing a method to switching OFF or putting to sleep, capacity BSs that are subjected to a light cellular traffic load. When the load increases again, the present invention provides a method for switching ON or waking up, the capacity BSs that are in sleep mode. The wake up process takes place with one capacity BS at a time and order of priority/preference, to maximize energy efficiency by avoiding switching ON unnecessary capacity BSs.

Figure 1:
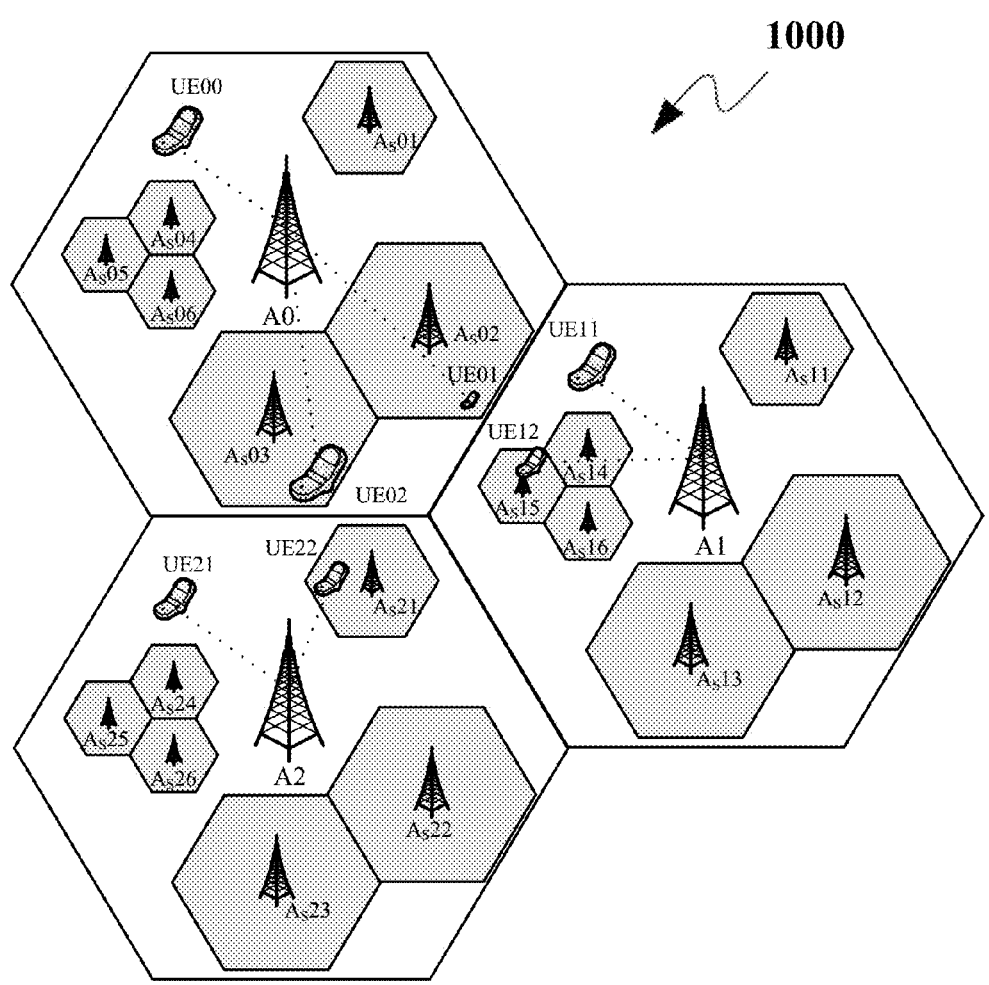
FIG. 1 illustrates a Heterogeneous Networks, according to an exemplary embodiment of the present invention.

Referring to FIG. 1 which illustrates a network 1000 of a cellular telecommunication system wherein a preferred embodiment of the present invention is implemented. In the preferred embodiment, the network 1000 is adapted as Heterogeneous Networks (also referred to as "HetNets"). The HetNets consists of a "hierarchical" network wherein each of a plurality of coverage base stations (also referred to as 'coverage BSs' or 'coverage cells') denoted by A0, A1, A2 (FIG. 1) and by 110 (FIG. 1A), is capable of providing cellular coverage in a given geographical area. To meet the increasing data rate/network capacity and Quality of Service (also referred to as 'QoS') requirements of mobile users, a plurality of capacity base stations (also referred to as 'capacity BSs' or 'Capacity Cells') denoted by $A_S01$, $A_S02$, $A_S03$, $A_S04$, $A_S05$, $A_S06$, . . . (FIG. 1) and by 120 (FIG. 1A), are deployed within the coverage area of the coverage base stations A0, A1, A2 or 110.

The capacity BSs typically cover smaller geographical areas within the umbrella of the coverage BS. In FIG. 1, macrocell BSs (also referred to as 'MBSs') are adapted as coverage BSs whereas small cell base stations (also referred to as 'SCBSs') are adapted as capacity BSs. The capacity BSs include microcells, picocells, etc. The UEs are denoted by UE00, UE01, UE02, . . . UE11, UE12, . . . UE21, UE22 . . . etc (FIG. 1). UEs are connected to the BSs in order to receive services from the network. The "hierarchical" structure adapted in this embodiment is needed only logically in order to provide control for the coverage BSs so that they may trigger the switch OFF/ON of the capacity BSs. The switch OFF method in this embodiment is described below with the help of flow graphs shown in FIG. 5 and FIG. 6.

Figure 1A:
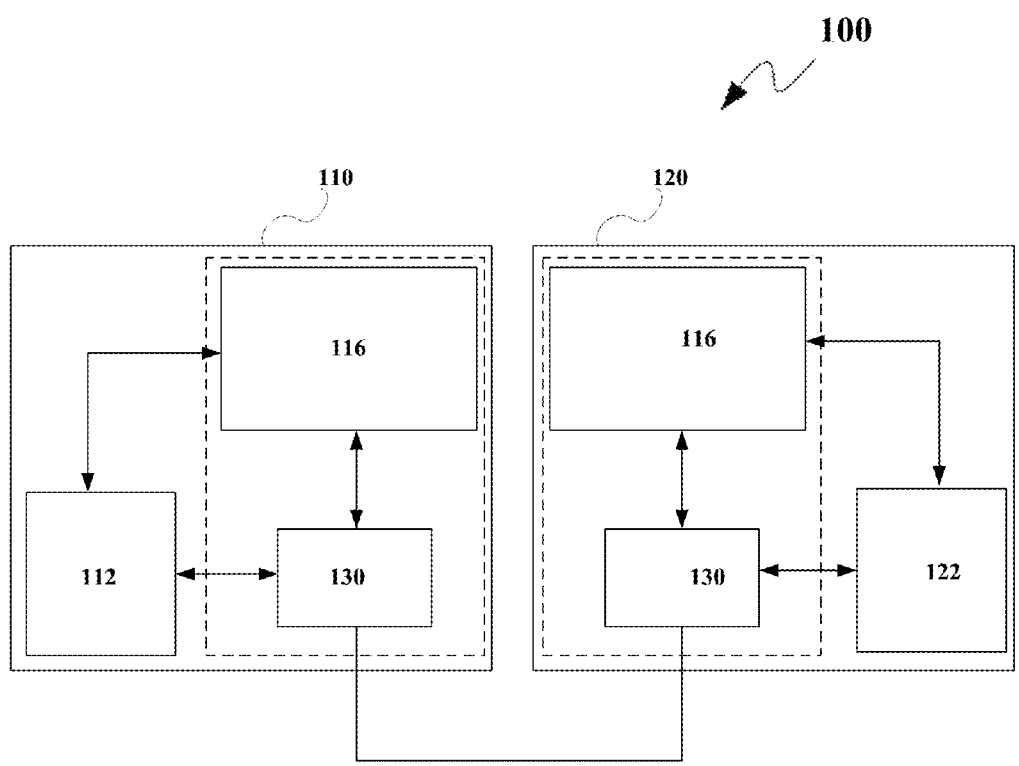
FIG. 1A illustrates a system for dynamically switching ON/OFF at least a capacity base station in a cellular network, according to an exemplary embodiment of the present invention.

Referring to FIG. 1A which illustrates a system 100 for dynamically switching ON/OFF at least a capacity base station 120 in a cellular network 1000. The system 100 comprises at least a coverage BS 110, at least a capacity BS 120, and at least a communication interface 130. At least a BS operation module 116 may be adapted for performing normal BS operation including access control, radio resource management, handover, etc.

The coverage BSs 110 are adapted in always active or switched ON mode i.e., the coverage BS may not be switched off for ensuring uninterrupted cellular coverage over a given area such that any user at any given time in their coverage areas may find cellular connectivity. The coverage BS 110 comprises a master controller 112 that incorporates a determining module which is capable of implementing at least a determining method. The determining module uses the information exchanged over the communication interface 130 in order to determine/select at least a capacity BS 120 for at least one of switched on and switched OFF mode. The determining module may also be implemented on any dedicated processor or on the processor in the BSs handling the communication between BSs.

The capacity BSs 120 are dedicated to satisfying the traffic demands of the users connected to the cellular network 1000, such that they offload the traffic that may not be handled by the coverage BSs 110. The capacity BSs 120 may be switched OFF when the traffic conditions permit in order to ensure energy efficiency. The capacity BS 120 comprises a slave controller 122 which is configured for at least dynamically switching at least the preferred capacity BS to one of the switched OFF mode and the switched ON mode according to instructions or command request of the coverage BS 110.

The communication interface 130 is adapted to provide interface between BSs, for example, to provide interface between at least the coverage BS 110 and the capacity BS 120. The communication interface 130 may support the exchange of handover information, load management information, and information for coordinated transmission to as given UE by more than one BS (CoMP).

At least a UE is connected to the BSs in order to receive services from the network. The UEs are connected to BSs over the air interface to receive wireless connectivity and related services. The UE is generally connected to the BS from where it receives the stronger signal. In LTE-A, UEs may be connected to more than one BS simultaneously, through the coordinated multipoint (CoMP) technology. CoMP is particularly useful in enhancing the QoS of UEs located close to the cell edge. CoMP is useful when two or three BSs are transmitting simultaneously to a UE. The coordination of simultaneous transmission takes place via BS communications over the corresponding Communication Interface 130.

The coverage BSs 110 are configured to control the ON/OFF switching of capacity BSs 120 deployed within the same area, for example, in FIG. 1 the coverage BS A0 is capable of controlling ON/OFF switching of the capacity base stations $A_S01$, $A_S02$, $A_S03$, $A_S04$, $A_S05$, and $A_S06$. Depending on the load conditions exchanged between the coverage BSs 110 and capacity BSs 120 by using communication and coordination signaling over the communication interface 130 (over the X2 interface in LTE-A standard), the coverage BS 110 may determine which capacity BS(s) may be switched OFF. Whenever there is a need to switch ON one or more capacity BSs to meet the increasing capacity demands when the traffic load increases, at least the coverage BS 110 informs at least the capacity BS 120 to go in to the switch ON mode again. The selection of which capacity BS 120 is to be switched ON at a given instant in time is decided by the coverage BS 110 in order of priority or preference i.e., based on the best CoMP BSs serving the increased load. CoMP may be performed with any active BS (i.e. that is switched ON), regardless if it is a coverage BS (MBS) 110 or a capacity BS (SCBS) 120, and whether it is within or outside the coverage area of the coverage BS 110.

According to the present invention, the ON/OFF switching process is performed dynamically, in a distributed way, while using information exchanged between BSs and UEs on the air interface, and between various BSs on the communication interface 130 between them, within the limits of state-of-the-art cellular standards, without additional information, particularly without any localization information about the UEs in the network. The ON/OFF switching process of the present invention is completely transparent to the UEs. On the other hand, the locations of the BSs are known (since they are fixed) and are assumed known to neighboring BSs either through operator configuration or through an automated self configuration approach that may be performed, for example, when a BS is first installed and operated in the network, in order to identify its neighbor BSs.

Figure 2A:
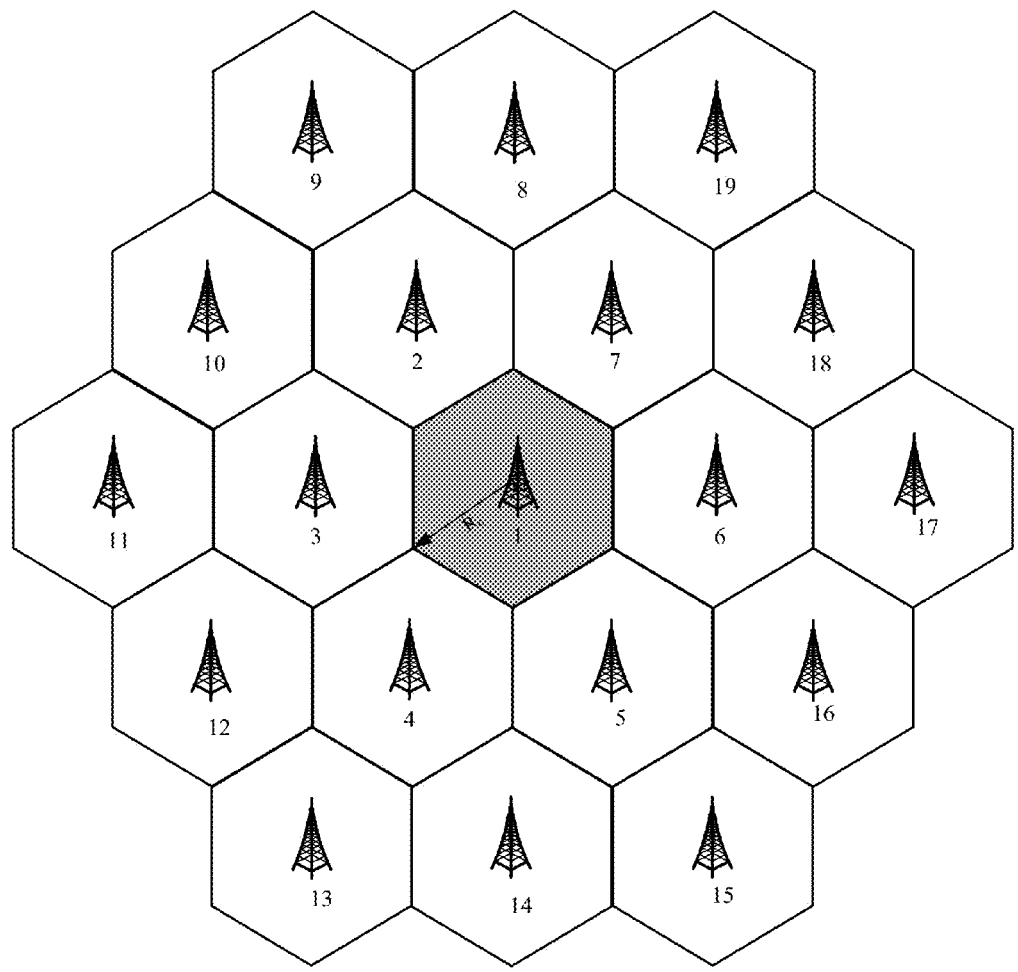
FIG. 2A illustrates an exemplary capacity BS deployment, according to an exemplary embodiment of the present invention.

Referring to FIG. 2A, which illustrates an exemplary capacity BS deployment wherein capacity base station BS 1 (in centre) is switched OFF and all the other capacity BSs 2-19 are switched ON. It is obvious in this case that when the load increases in capacity BSs 2-7, then the capacity BS 1 may be switched ON to offload some of the traffic load of capacity BSs 2-7.

Figure 2B:
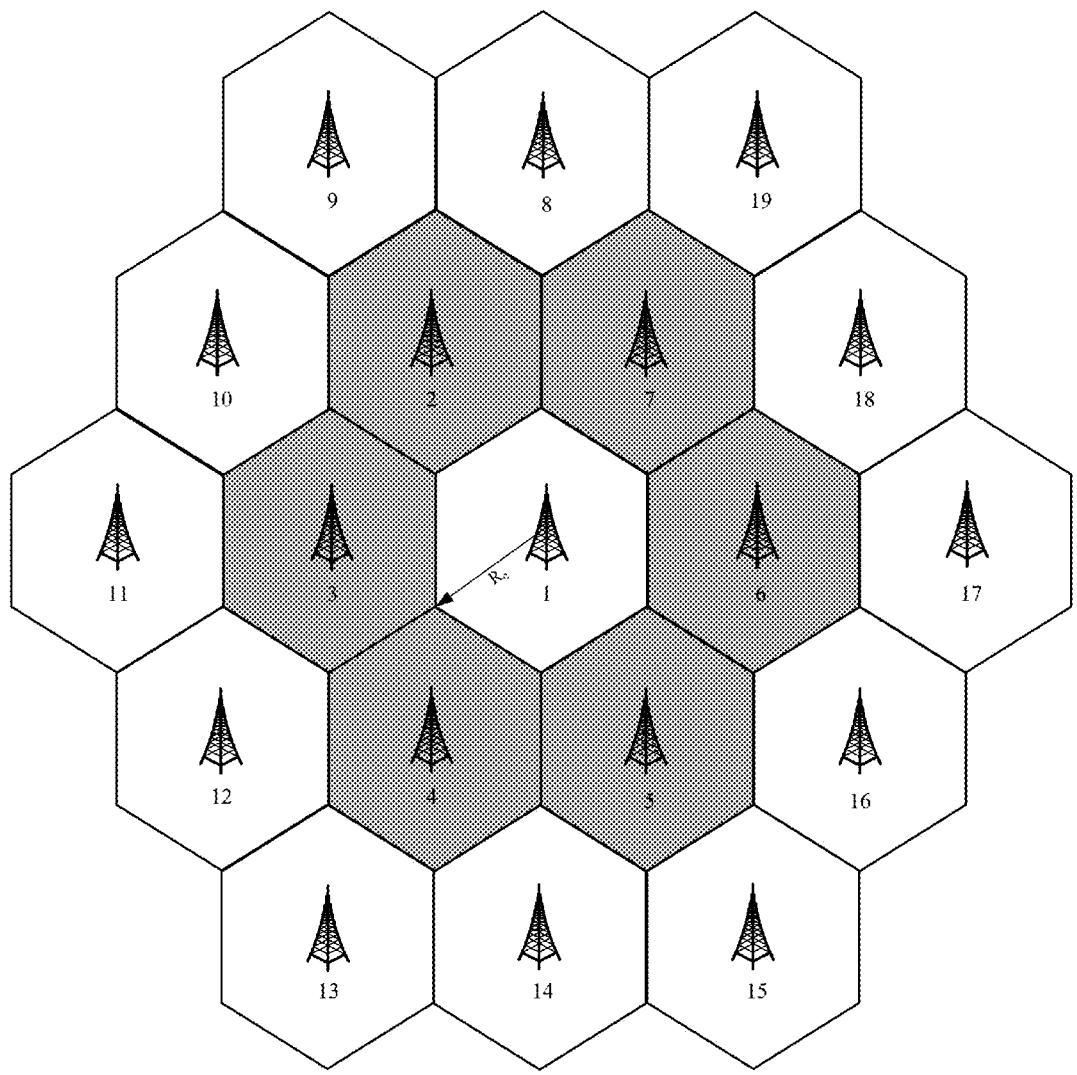
FIG. 2B illustrates another exemplary capacity BS deployment, according to an exemplary embodiment of the present invention.

Referring to FIG. 2B which illustrates another exemplary capacity BS deployment wherein the situation is reversed with regard to the situation in FIG. 2 because the capacity BS 1 is switched ON, along with capacity BSs 8-19, whereas capacity BSs 2-7 are switched OFF. If the traffic increases in capacity BS 1, it may be difficult which of the capacity BSs 2-7 may be switched ON first. The present invention uses the information from the coordinated multipoint (CoMP) technique to determine the right capacity BS for switching ON.

Through the coordinated multipoint (CoMP) technology, UEs may be connected to more than one BS simultaneously. The CoMP is particularly useful in enhancing the QoS of UEs located close to the capacity cell edge. The CoMP is most beneficial when two or three BSs are transmitting simultaneously to a UE. The coordination of simultaneous transmission takes place via base station communications over the corresponding Communication Interface 130, e.g. X2 interface in LTE-A.

Figure 3:
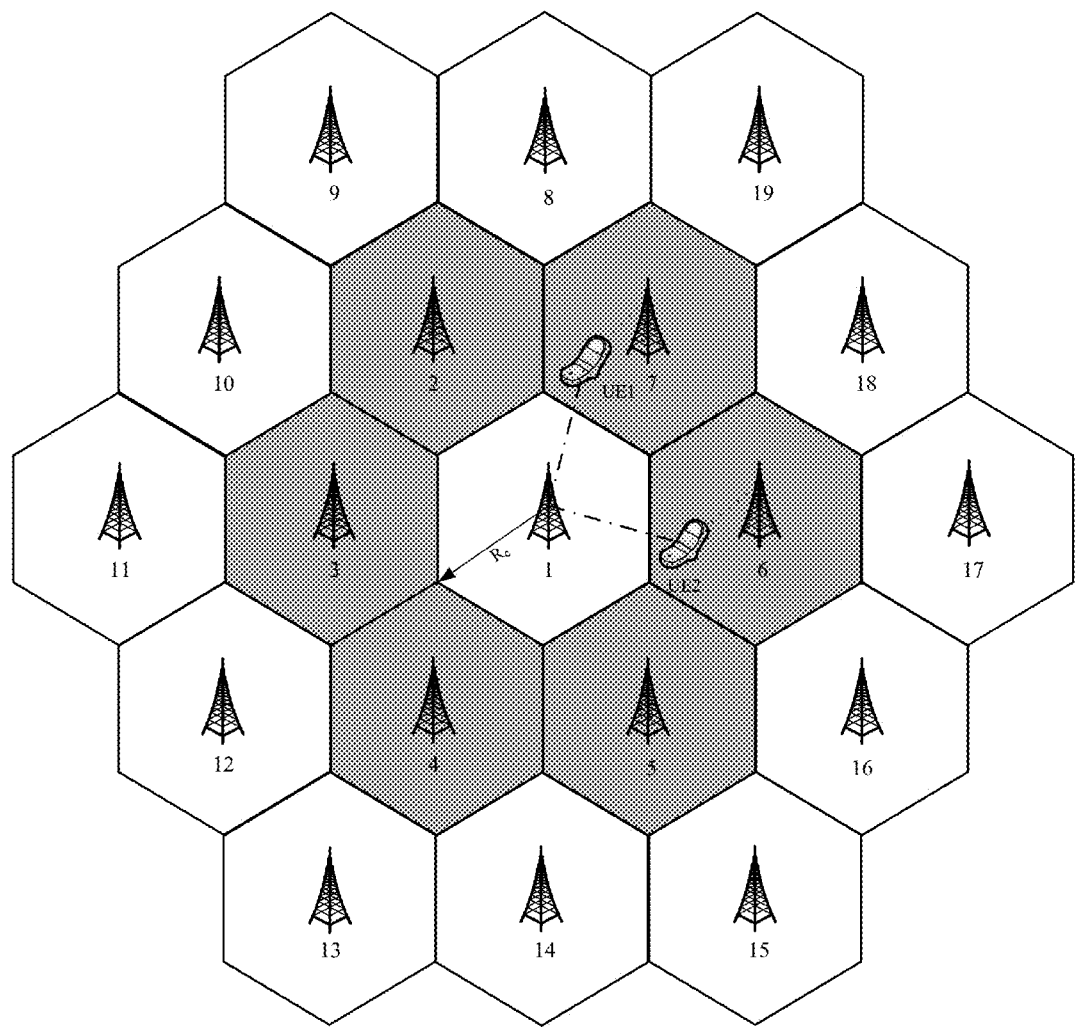
FIG. 3 illustrates working of the present invention in a scenario of FIG. 2B, according to an exemplary embodiment of the present invention.

Referring to FIG. 3 which illustrates working of the present invention a scenario of FIG. 2B, according to an exemplary embodiment of the present invention. User equipments UEs 1 and UE2 are connected to capacity BS 1 (dash-dot lines). When capacity BSs 6 and 7 are switched ON, the UE1 may be offloaded to capacity BS 7 (dotted line) and the UE 2 may be offloaded to capacity BS 6 (dotted line). If a significant number of UEs are connected to capacity BS 1 as is the case of UE1, and receiving data via CoMP from other capacity BSs 18 and 19 or BSs 8 and 19, then capacity BS 7 may be switched ON to offload some of the traffic. As another example, corresponding to UE2, if a significant number of UEs are connected to capacity BS 1 receiving data via CoMP from other capacity BSs 17 and 18 or BSs 16 and 17, then the capacity BS 6 may be switched ON to offload some of the traffic.

Figure 4:
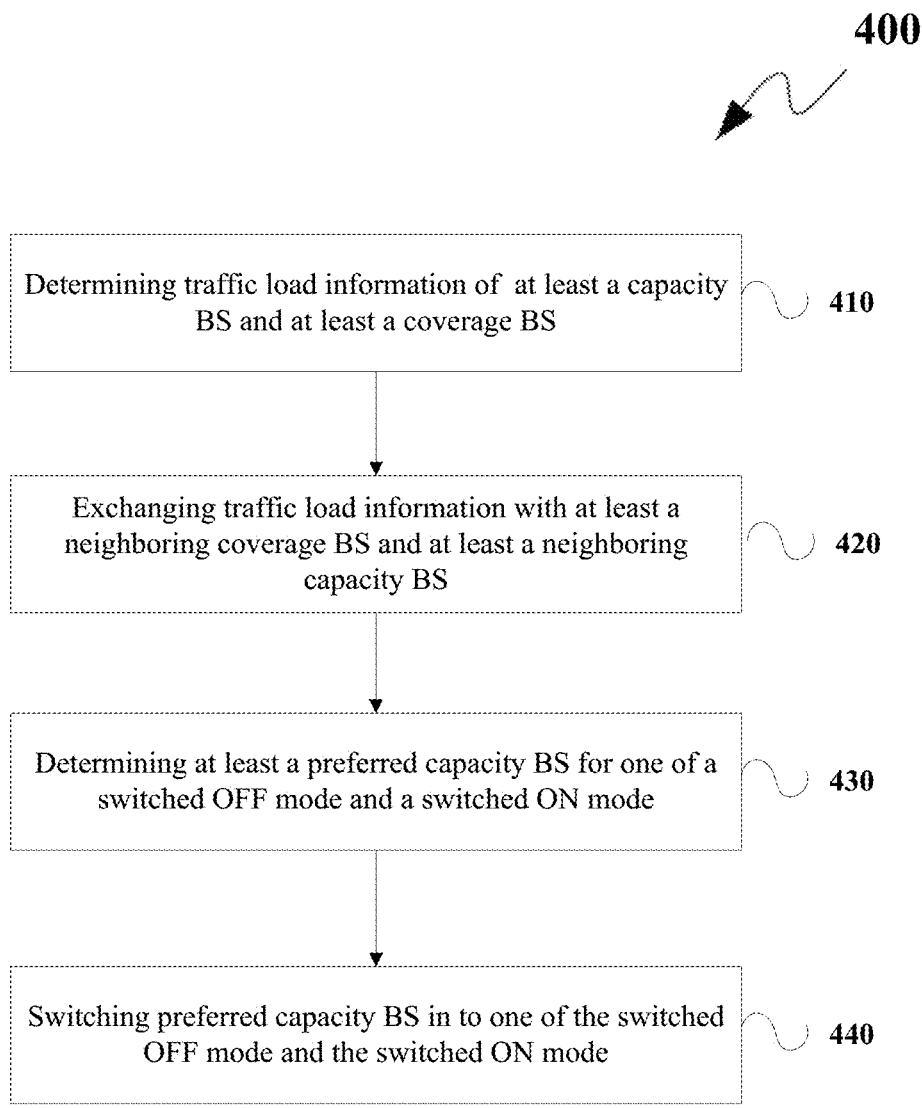
FIG. 4 illustrates a flowchart of a method for dynamically switching at least a base station in ON/OFF mode, according to an exemplary embodiment of the present invention.

Referring to FIG. 4 which illustrates a flowchart of a method 400 for dynamically switching at least a base station in ON/OFF mode in the network 1000, according to an exemplary embodiment of the present invention. The method 400 comprises determining traffic load information of at least a capacity BS 120 and at least a coverage BS 110 at a step 410, exchanging the traffic load information with at least a neighboring coverage BS 110 and at least a neighboring capacity BS at a step 420, determining at least a preferred capacity BS for one of a switched OFF mode and a switched ON mode at a step 430, and switching the preferred capacity BS to one of the switched OFF mode and the switched ON mode at a step 440. The preferred capacity BS is one of the capacity BS and a neighboring capacity BS corresponding to the coverage BS 110.

Each active BS determines its traffic load and exchanges this information with its neighboring BSs including at least a neighboring capacity BS and at least a neighboring coverage BS 110. In addition to determining its own load information, the coverage BS 110 also collects the load information from other BSs, particularly from at least the capacity BSs associated to the coverage BS 110. The coverage BS 110 may also communicate the load information with other BSs, including capacity BSs that are not under its control or other coverage BSs, as mandated by normal network operation.

At least the capacity BS 120 sends the traffic load information to their corresponding coverage BSs. The capacity BS 120 may also sends the traffic load information to other BSs, including BSs that are not under the control of the corresponding coverage BS 110, as mandated by normal network operation.

Based on at least the traffic load information determination and exchange, a the master controller 112 is capable of implementing at least a determining method at the coverage BS 110 for determining at least the preferred capacity BS for one of the switched OFF mode and the switched ON mode.

Based on at least one of the load information determination, exchange, and a command received from the master controller 112, a slave controller 122 is capable of implementing at least a switching method for switching at least the preferred capacity BS to one of the switched OFF mode and the switched ON mode to meet traffic load requirement of the network 1000.

The switching of the preferred capacity BS to the switched OFF mode further comprises handing at least an user equipment from the preferred capacity BS to at least one of the capacity BS 120, coverage BS 110, and the neighboring coverage BS before going to switched OFF mode. The switching the preferred capacity BS to the switched OFF mode may further comprises keeping the capacity BS 120 switched ON and informing it's status to at least one of coverage BS 110, the neighboring capacity BS 120, and the neighboring coverage BS if at least an user equipment connected with the capacity BS 120 remain unhanded.

If the determining method decides to switch ON at least a capacity BS 120, the CoMP information with at least one of coverage BS 110, the capacity BS 120, and the neighboring coverage BS may be used to determine the preferred or best or specific capacity BS to be switched ON.

If the determining method decides to switch ON the preferred or specific capacity BS, the preferred or specific BS is informed by the master controller 112 of coverage BS 110 through a command to wake-up i.e., to go into active or switched ON mode. The preferred capacity BS receiving the command to wake up and go in to switched ON mode and starts up the operation. The slave controller 122 is capable of executing the master controller 112 or coverage BS 110 command for handling switched ON mode and Switched OFF mode of the preferred capacity BS.

The switching of the preferred capacity BS to the switched ON mode further comprises handing at least the user equipment within service area of the preferred capacity BS from one of the capacity BS 120, coverage BS 110, and the neighboring coverage BS to the preferred capacity BS which is now in switched ON mode. At least the user equipment in the service area of the preferred capacity BS was served by at least one of the capacity BS 120, coverage BS 110, and the neighboring coverage BS during the switched OFF mode of the preferred capacity BS.

Figure 5:
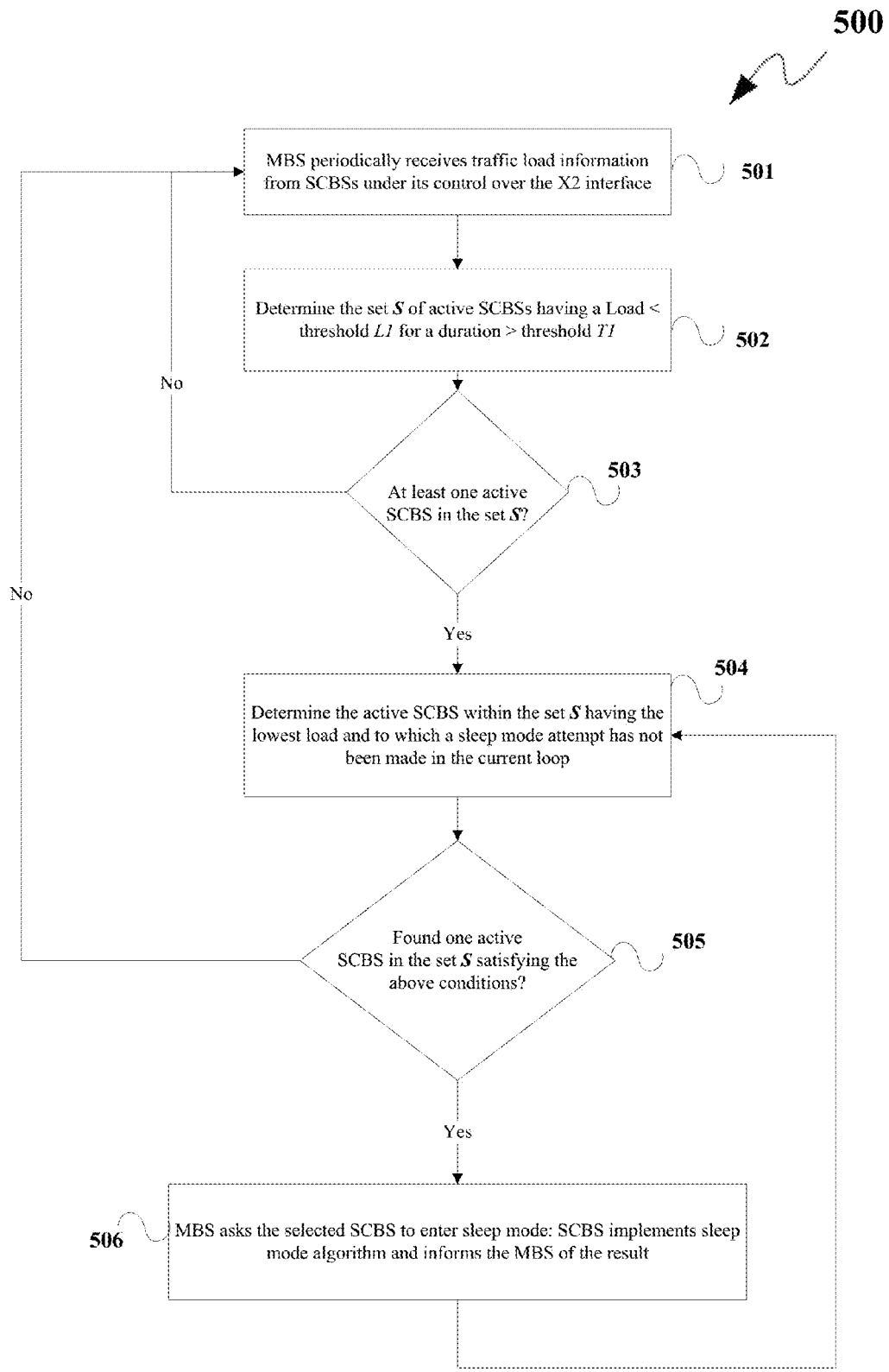
FIG. 5 illustrates a flowchart of a determining method implemented at the coverage BS for determining at least the preferred BS for a switched OFF mode, according to an exemplary embodiment of the present invention.

Now referring to FIG. 5 which illustrates a flowchart of a determining method 500, implemented at coverage BS 110 (Macro BS in a HetNet) for determining at least the preferred capacity BS for the switched OFF mode, according to an exemplary embodiment of the present invention.

The determining method 500 starts at a step 501 wherein the BSs exchanges the traffic load information over the Communication Interface 130 for example, the X2 interface in LTE, between the BSs, i.e., between at least coverage BS 110, the capacity BS 120, the neighboring coverage BS, and the neighboring capacity BS during normal network operation. From this exchanged information, coverage BS 110 (also referred to as "MBS") at a step 502 may determine the neighbor BSs of which the load is decreased beyond a certain threshold. At a step 503 the determining method 500 checks if there is at least one capacity BS 120 (preferred capacity BS) where the load has decreased beyond a limit threshold, the MBS attempts to switch off at least the preferred capacity BSs (also referred to as "SCBS") with low traffic load. The determining method 500 may further attempt to switch off other SCBSs with low traffic load in order of preference by iterating over these SCBSs and trying to switch them off one by one.

At a step 504, the MBS determines the SCBS within its coverage area that has the smallest load and to which no switch off attempt has been made so far. The reason for determining the SCBS within the coverage area of MBS that has the smallest load and to which no switch off attempt has been made so far is to avoid unnecessary switch off attempts of lightly loaded SCBSs in case recent attempts have failed. If such an SCBS has been found at a Step 505, the MBS sends a request or command to this SCBS to enter sleep mode at a Step 506. The SCBS may then implement a determining method 600 at the capacity BS 120 for determining at least the preferred capacity BS for the switched OFF mode as described in FIG. 6 and inform the MBS of the outcome. The determining method 500 implemented at the MBS loops back to the step 504 until an attempt has been made on all the SCBSs having low traffic load.

Figure 6:
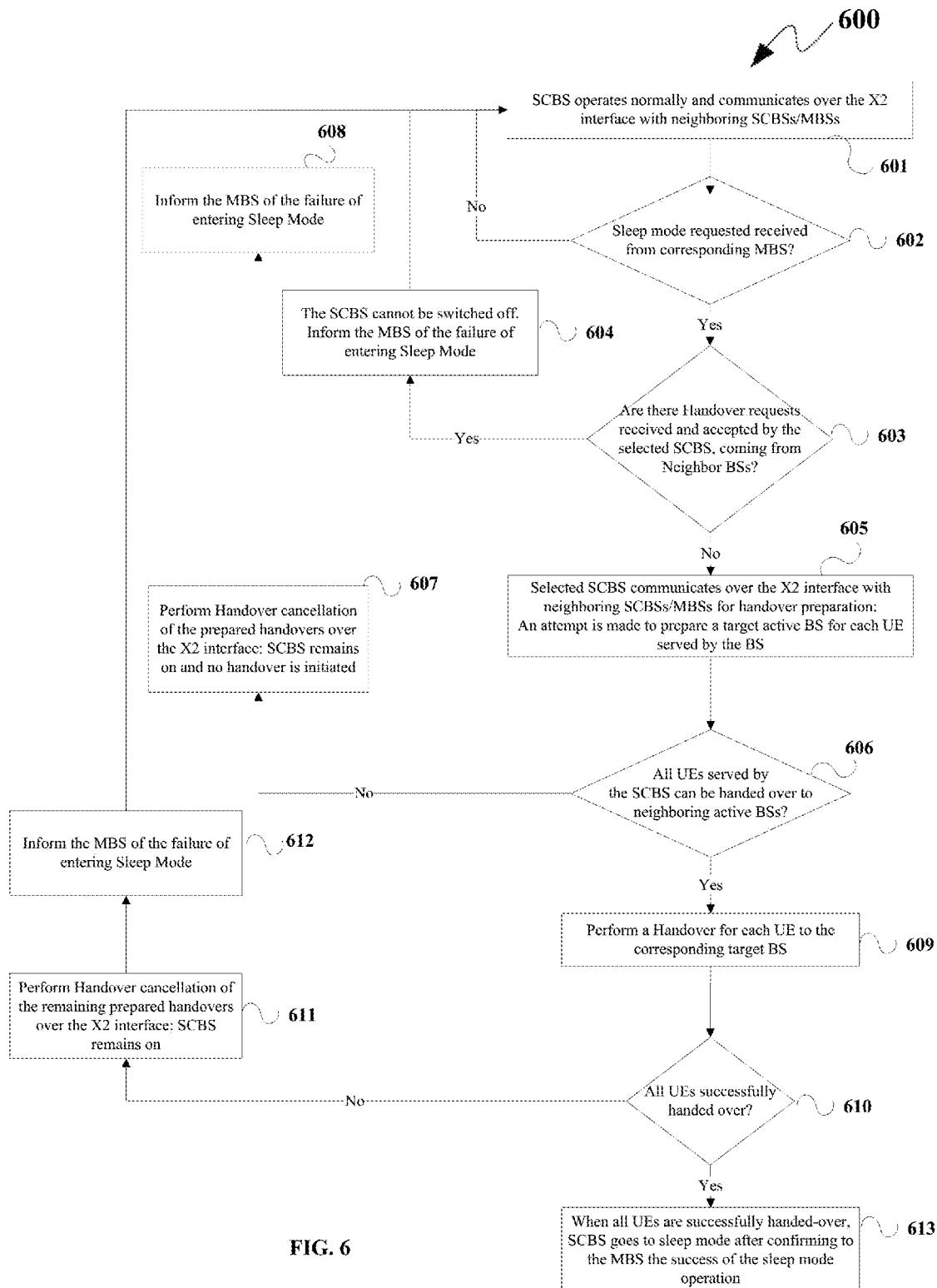
FIG. 6 illustrates a flowchart of the determining method implemented at at least the capacity BS for determining at least the preferred BS for the switched OFF mode, according to an exemplary embodiment of the present invention.

Referring to FIG. 6 which illustrates a flowchart of the determining method 600 implemented at at least the capacity BS 120 for determining at least the preferred capacity BS for the switched OFF mode.

The determining method 600 starts at a step 601 wherein during normal network operation, the SCBS exchanges information with the other BSs similarly to the operation of MBS at the step 501 of FIG. 5. When a switch off request is received by the SCBS at a step 602, the determining method 600 checks whether the SCBS is in the process of accepting handover requests from at least an user equipment (also referred to as "UE") in other BSs at a step 603. If the UE may be handed over to the SCBS, the SCBS does not enter into sleep mode in order not to drop the UEs that may be handed-over at a Step 604. If no handover requests are pending for UEs to join the SCBS, the SCBS may attempt to handover its existing UEs (the UEs SCBS is already serving) to neighboring BSs. It sends handover preparation information to neighbor BSs at a step 605.

Further the SCBS checks if all the handover requests are accepted by the neighbor BSs at a step 606. If at least one request is rejected, the SCBS sends handover cancellation requests to cancel the prepared handovers at a step 607 and informs the MBS of the failure of the switch off process at a step 608, and continues operation normally at the step 601. If all requests are accepted, the SCBS starts systematically executing the prepared handovers a step 609. In case at least one of the handovers fails at a step 610, the SCBS cancels the remaining prepared handovers at a step 611 and informs the MBS of the failure of the switch off process at a step 612, and then continues operation normally at the step 601. When all the prepared handovers are successfully completed, the SCBS goes into sleep mode after informing the MBS of the success of the operation at a step 613. If there are no UEs served by the SCBS when the switch off request is received, the determining method 600 moves directly from the step 605 to the step 613.

When a number of BSs have been switched off, and if the traffic load starts increasing again in the network, there may be a need to switch on some of them gradually, until the network may serve the connected UEs.

Figure 7:
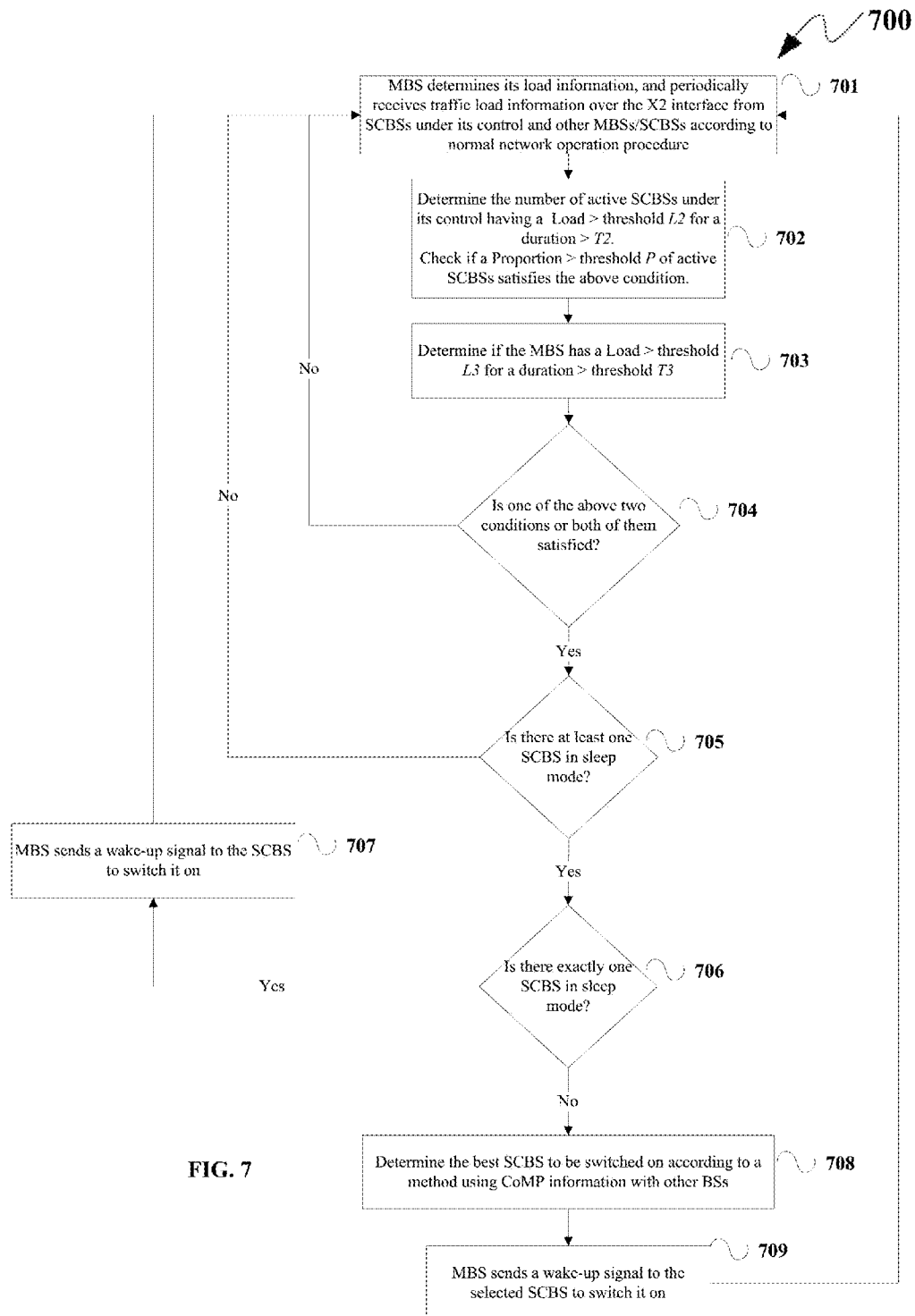
FIG. 7 illustrates a flowchart of a determining method implemented at at least the coverage BS for determining at least the preferred BS for a switched ON mode, according to an exemplary embodiment of the present invention.

Now referring to FIG. 7 which illustrates a flowchart of a determining method 700, implemented at at least coverage BS 110 for determining at least the preferred capacity BS for the switched ON mode, according to an exemplary embodiment of the present invention. Active BSs exchanges traffic load information over the Communication Interface 130 between them during normal network operation at a step 701. From this exchanged information, the MBS may determine at least the neighboring BS, for example, at least one of neighboring capacity BS and neighboring coverage BS, of which the load increased beyond a certain threshold at a step 702, or if at least the MBS itself is supporting a load beyond a certain threshold at a step 703. In case a load increase is beyond a target threshold at a step 704, the MBS checks its records to determine if it has set at least a SCBS into sleep mode at a step 705. If there is exactly one SCBS that was switched off at a step 706, the MBS sends to the SCBS a wake-up signal to switch the SCBS on again at a step 707. If more than one SCBS are switched off, the MBS determines the best one to switch on at a step 708 using a method 800 as described in FIG. 8. After determining at least the SCBS to switch on, the MBS send to the SCBS a wake up signal at a step 709, after which the selected SCBS implements the switch on procedure as described in FIG. 9.

When the load in the network increases on the active BSs, several UEs may be served simultaneously by multiple BSs using the CoMP technique, particularly cell edge UEs. The cell is a geographical area served by the BS and the BS is generally located at the center of the cell. UEs can be located anywhere in the cell, however, the UEs at the cell edge being candidates that are generally more suitable for CoMP. The CoMP technique is also applied by active BSs in order to maintain the energy savings of the network by allowing the switched off BSs to remain in sleep mode. In one embodiment, the present invention uses the information exchanged to prepare and/or maintain CoMP connections in order to determine the best SCBS to switch on.

Figure 8:
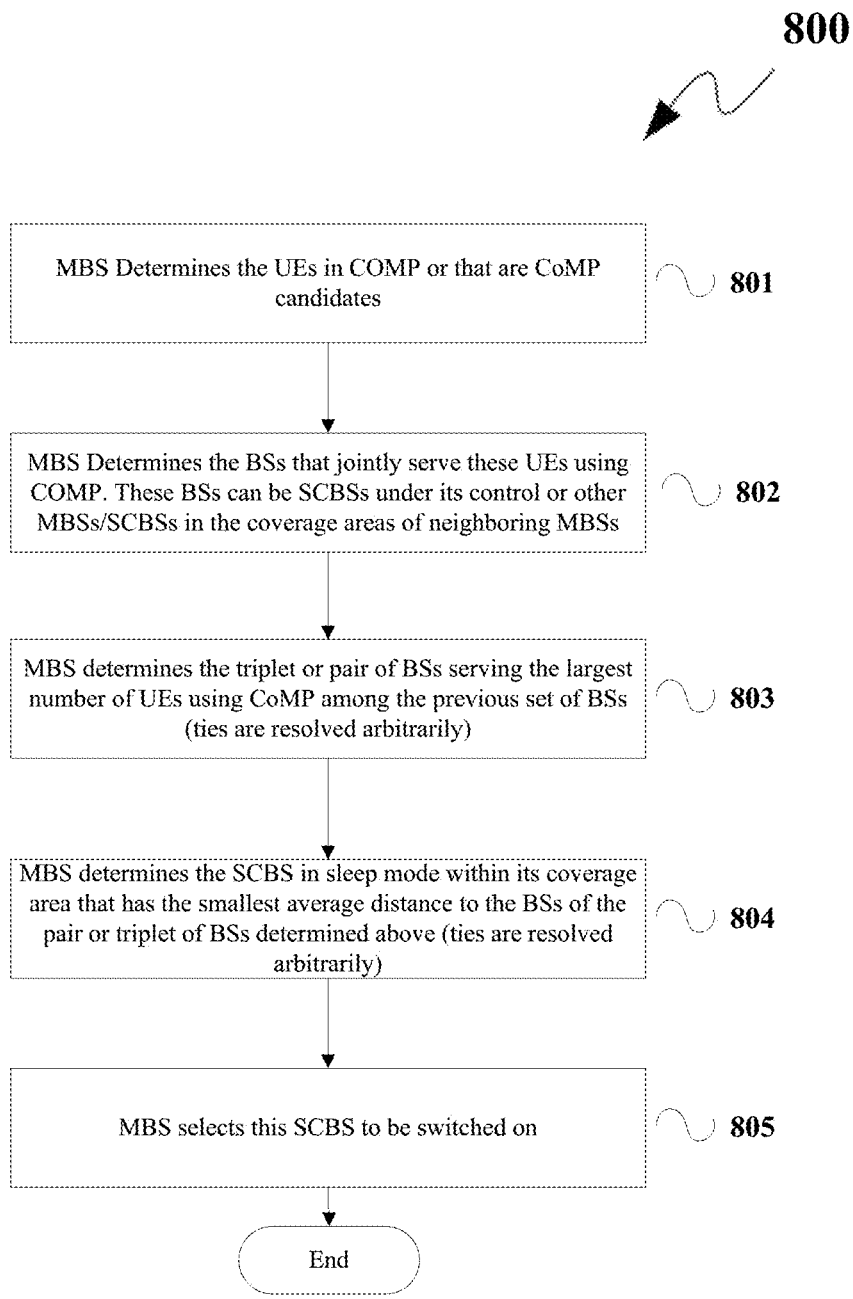
FIG. 8 illustrates a flowchart of a determining method implemented at at least the coverage BS for determining at least the preferred BS for switching ON mode using the CoMP signaling information, according to an exemplary embodiment of the present invention.

Now referring to FIG. 8 which illustrates flowchart of BS selection method 800 implemented at at least coverage BS 110 for determining/selecting at least the preferred or best capacity BS for switching ON mode using the CoMP signaling information, according to an exemplary embodiment of the present invention.

The BS selection method 800 wherein the MBS starts first by determining the number of UEs that are served using CoMP or that are CoMP candidates at a step 801, i.e., to which CoMP signaling has been exchanged with other active BSs in order to initiate CoMP transmissions. Through this exchanged information, at least the MBS may determine an active BS or plurality of active BSs that are jointly serving UEs with it using CoMP at a step 802. In practice, a group of BSs (preferably two or three BSs) are selected to serve a given UE using CoMP. Hence, the serving BSs of the group may be either pairs or triplets. The MBS may determines at least the pair or triplet of BSs serving the largest number of UEs using CoMP at a step 803, wherein the MBS is generally a member of this pair or triplet. In case more than one pair or triplet is serving the same number of UEs, ties are resolved arbitrarily and any of the pairs/triplets serving the largest number of UEs may be selected. The MBS determines at least the SCBS within its coverage that is in sleep mode and that has the smallest average distance to the BSs of the selected pair/triplet at a step 804, and selects this SCBS to be switched on at Step 805. Again, here, ties are resolved arbitrarily in case more than one BS in sleep mode has the same average distance to the most loaded CoMP pair/triplet. Several examples may be considered according to the FIG. 1 in order to further describe the determining method 800.

Now referring to FIG. 1, wherein if SCBS As02 is switched off, and UE01 is served by CoMP through the MBS A0, the SCBS As03, and the SCBS As15 (the BSs in this triplet are assumed switched on), then the SCBS in the coverage area of BS A0 to be switched on is As02, since the average distance {[(distance from BS As02 to BS A0)+(distance from BS As02 to BS As03)+(distance from BS As02 to BS As15)]/3} is less than the average to distance to the BSs of this triplet from any other SCBS in sleep mode within the coverage of MBS A0.

In another example according to the FIG. 1, if SCBS As21 is switched off, and UE22 is served via CoMP by the pair consisting of the MBS A2 and the SCBS As03, then the BS to be switched on in the coverage area of A2 is As21, since {[(distance from BS As21 to BS A2)+(distance from BS As21 to BS As03)]/2} is less than the average to distance to the BSs of this pair from any other SCBS in sleep mode within the coverage of MBS A2 (assuming for example that As24, As25, As26, As22, and As23 are switched off). The same result may be reached (switch on As21) if the best CoMP serving pair consisted of MBS A2 and MBS A0, assuming the load is increasing on A2 and that As03 is switched off in the coverage area of A0.

In another example according to the FIG. 1, if SCBSs As 14, As 15, and As16 are all switched off, and UE12 is served by the CoMP pair consisting of MBS A1 and SCBS As02, then the present invention may lead to switching on SCBS As 15 (which is the best option), or possibly As 14 (since the average distances to the CoMP pair are comparable). This limiting case may possibly happen in situations where several small cells are close to each other with very limited ranges. In that case, As 14 may either successfully serve UE 12 (due to its relative proximity, although it is not as close as As15), or serve it jointly with A1 and As02 using CoMP (or possibly just with A1), which may also help reduce the load on the network. If in that latter case the load still did not decrease beyond the target thresholds, the implementation of the determining method 700 in FIG. 7, which calls the determining method 800 in FIG. 8 at the step 708, may lead to switching on BS As15, as the closest in terms of average distance to A1, As02, and As14. Hence, the present invention gracefully and gradually provides the optimal solution with the accuracy of the sleeping BS selection increasing with the number of BSs that are active.

The number of UEs as shown in FIG. 1 are for illustrative purposes, and generally a significantly larger number is needed to exceed load thresholds. Thus, the switch on of SCBS As14, although may not be the best but may be the second best for serving UE12, may offload several other users within the same vicinity and reduce the traffic loads below the thresholds, which may allow keeping SCBS As15 in sleep mode even while serving UE12.

Figure 9:
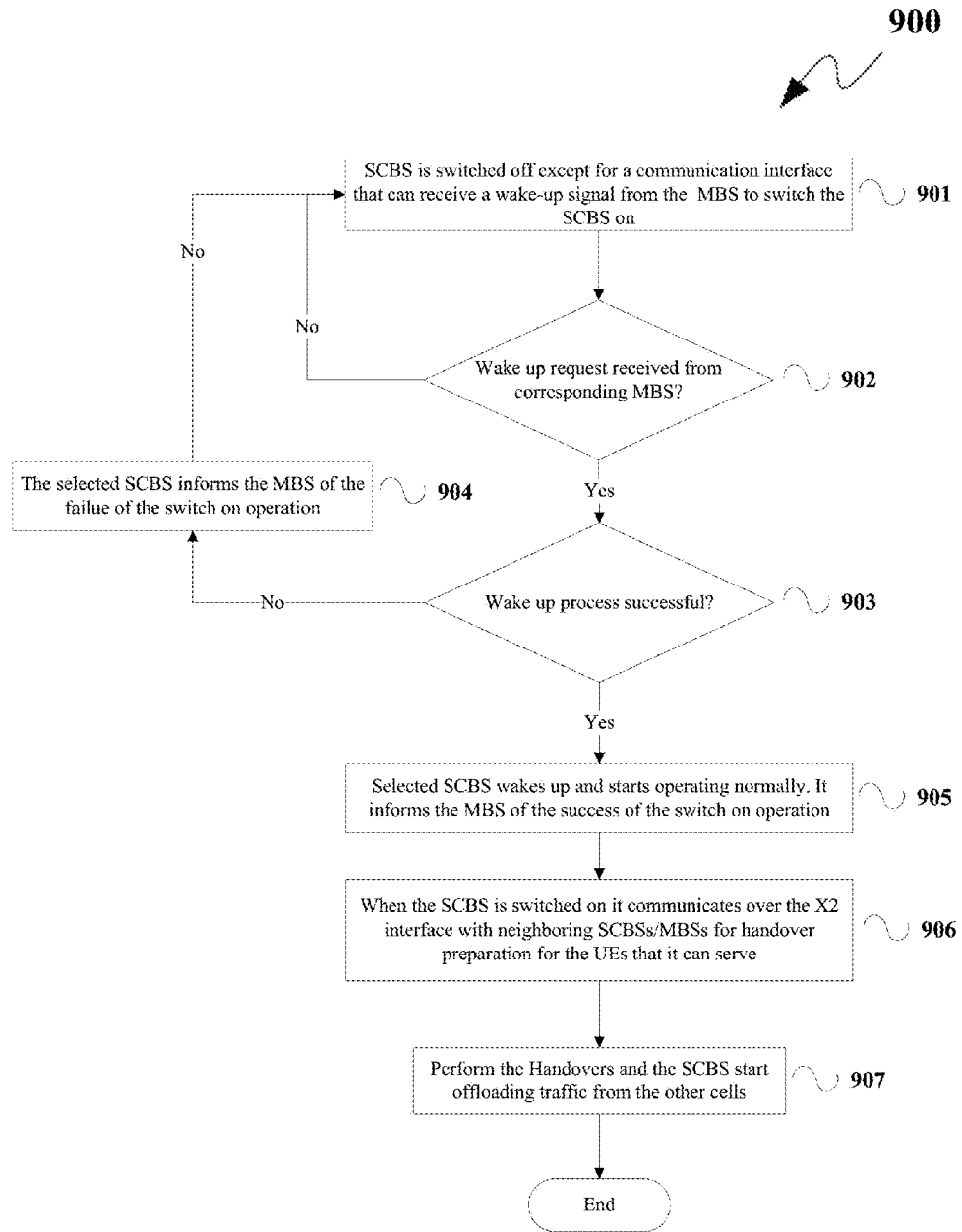
FIG. 9 illustrates a flowchart of a switch ON method implemented at at least the BS for prioritize switching of the BS in the switched ON mode, according to an exemplary embodiment of the present invention.

Referring to FIG. 9 which illustrates a flowchart of a switch ON method 900 implemented at at least the capacity BS 120 for prioritize switching of at least the capacity BS 120 in the switched ON mode. After determining a BS to switch on according to the determining method 800 of the FIG. 8, the MBS sends the capacity BS 120 a wake up signal at the step 709 of the determining method 700 described in FIG. 7. Afterwards, the switch ON method 900 is implemented at the SCBS for switch ON.

The switch ON method 900 starts with the SCBS in sleep mode at a step 901. The present invention is flexible towards the definition of "switch off" or "sleep mode", which may include switching off components or parts of the BS up to switching off the whole BS, except of the capability of receiving a triggering wake up signal from the MBS in order to wake up and return to active switched on mode. In case such wake up signal is received, the SCBS attempts to wake up at a step 902. If the process fails at a step 903, the SCBS sends an indication to the MBS indicating the failure of the operation at a step 904 and remains in sleep mode. The MBS may then either attempt another time or take some self healing measures in the network, for example, continue with other sleeping BSs according to the determining method 700 of the FIG. 7. If the switch ON process is successful at a step 903, the SCBS starts operating normally at a step 905. Hence, it may start serving UEs within its range. So it may prepare at a step 906 and execute handovers at a step 907 via coordination with neighboring BSs over the Communication Interface 130 between BSs.

According to an exemplary embodiment, the present invention is capable of being implemented in a homogeneous macrocell networks with coverage BSs and capacity BSs wherein all BSs i.e., coverage BSs and capacity BSs are considered as MBSs. In this embodiment, the same approach may be applied as long as distinction may be made between coverage BSs and capacity BSs. In this case, it is assumed that coverage BSs may increase their coverage when a neighboring capacity BS 120 is switched off, for example, using CoMP to increase the coverage area of the active cells, and/or increasing the transmit power of the BS to increase the coverage area. Although all BSs are of the same type, a "hierarchical" structure may be needed only logically in order to provide control for the coverage BSs so that they may trigger the switch off/on of the capacity BSs. In this exemplary embodiment, the switch off methods may still be represented by the flowcharts of FIGS. 5 and 6 and the switch on process may still be represented by the flowcharts of FIGS. 7, 8, and 9, wherein the term "MBS" referred to as "coverage BS", and the term "SCBS" referred to as "capacity BS".

According to an exemplary embodiment, the present invention is capable of being implemented in a homogeneous small cell networks with coverage BSs and capacity BSs. wherein all BSs i.e., coverage BSs and capacity BSs are considered as SCBSs. This embodiment is similar to the above described exemplary embodiment for homogeneous macrocell networks with the difference that only SCBSs are considered. Thus, the coverage range of each BS in a given geographical area in this embodiment may be relatively small, for example, (in the range of 100-200 meters, as may be dictated by its maximum transmission power. In this exemplary embodiment, the switch off methods may still be represented by the flowcharts of FIGS. 5 and 6 and the switch on process may still be represented by the flowcharts of FIGS. 7, 8, and 9, wherein the term "MBS" referred to as "Coverage BS", and the term "SCBS" referred to as "capacity BS".

Figure 10:
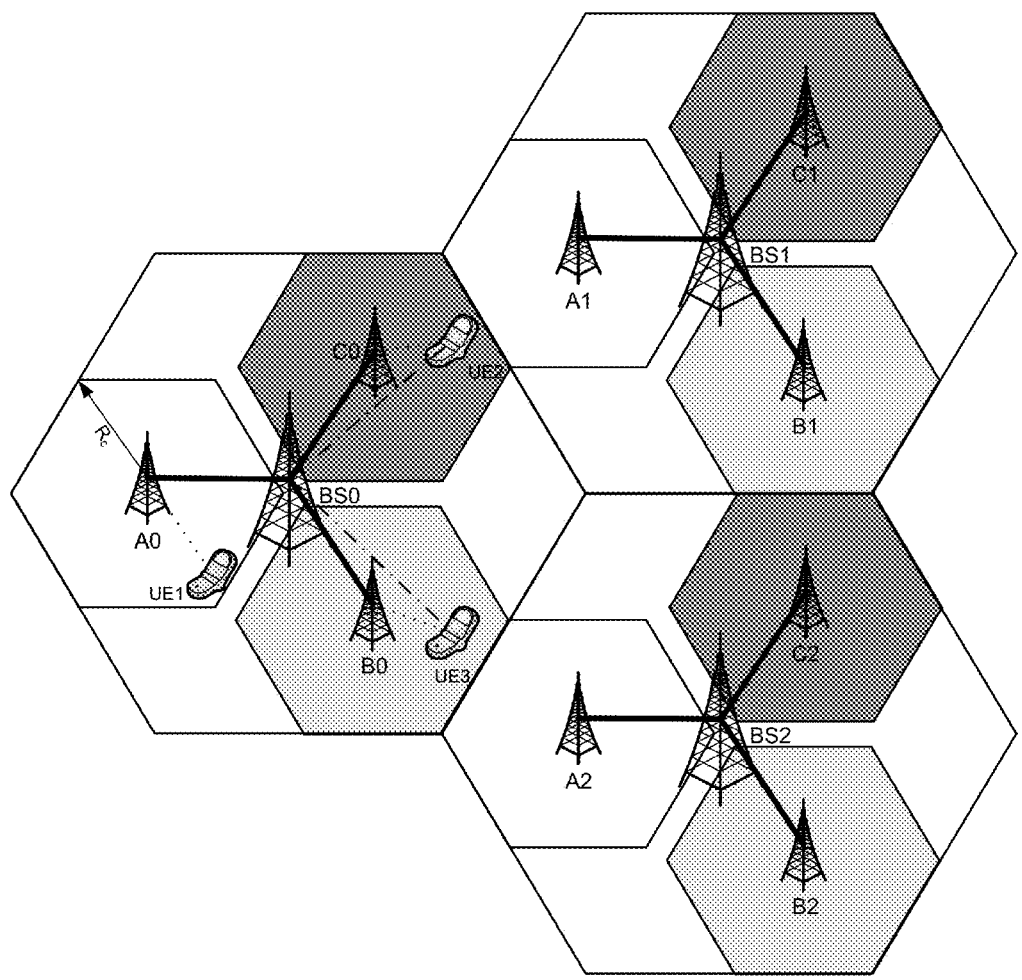
FIG. 10 illustrates an exemplary distributed antenna system deployment, according to an exemplary embodiment of the present invention.

Referring to FIG. 10 which illustrates an exemplary distributed antenna system (also referred to as DAS) deployment wherein the present invention is capable of being implemented. In FIG. 10 the coverage areas of central cells are shown in white, and coverage areas of remote antenna heads (also referred to as "RAHs") of each cell are shown in different shades of grey. Dash-Dot lines correspond to connection between UEs and central BSs when RAHs are off. Dotted lines correspond to connection between UEs and RAHs when RAHs are on. Thick solid lines correspond to wired connections between central BSs and their corresponding RAHs. The DAS consists of several remote antenna heads (RAHs) connected to a central BS enclosure through a wired connection (for example optical fiber). The BS may implement the present invention to switch off/on the various RAHs. The connection between the BS and its corresponding RAHs is not standardized and may be implemented independently by each manufacturer. The central BS has its own antenna, and may distribute the total transmit power between the central antenna and the RAHs.

Each of the three BSs (BS0, BS1, and BS2) of FIG. 10, is equipped with a DAS system comprise of three RAHs per BS, for example, A0, B0, and C0 for BS0; A1, B1, and C1 for BS1; and A2, B2, and C2 for BS2.

An exemplary variation of the present invention maybe implemented with the BSs operating under the DAS, i.e. controlling several RAHs. In the FIGS. corresponding to this embodiment, the term eNB refers to a BS, wherein eNB=enhanced Node B, which is the standard terminology in LTE/LTE-A, since there is no need to distinguish between MBSs and SCBSs, as DAS may be implemented with both types of BSs.

Figure 11:
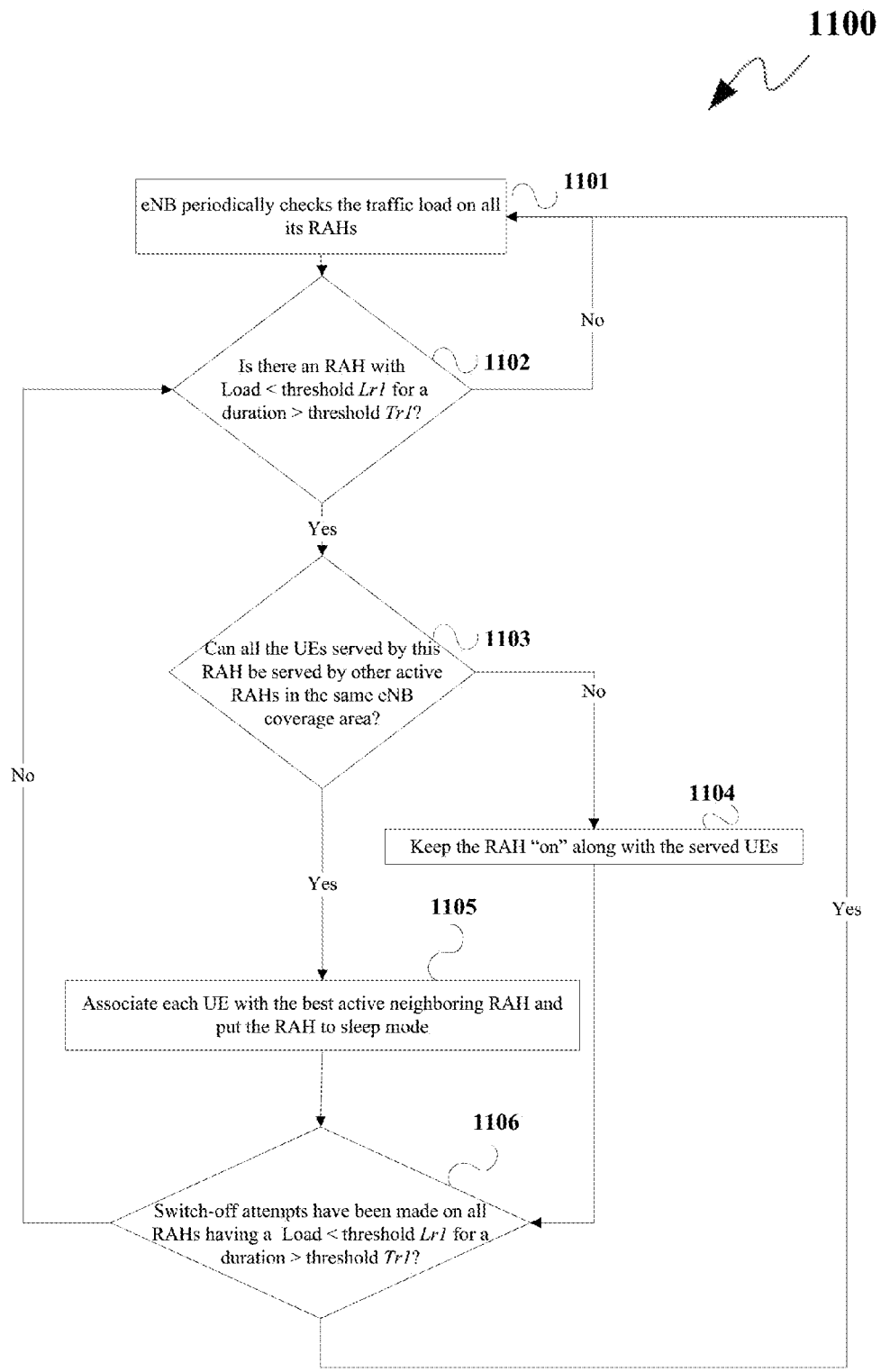
FIG. 11 illustrates a flowchart of a method for RAH Switch OFF in the case of DAS implemented at the eNB (BS) to switch off lightly loaded RAHs, according to an exemplary embodiment of the present invention.

Referring to FIG. 11 which illustrates a flowchart of a method 1100 for RAH Switch off in the case of DAS implemented at the eNB (BS) to switch off lightly loaded RAHs, according to an exemplary embodiment of the present invention. Since the central eNB has full control of the RAHs, it may determine the traffic load and the number of UEs associated to each RAH at a step 1101. If an RAH has a load below a certain threshold at a step 1102, the eNB attempts to offload the UEs served by the RAH to neighboring RAHs of the same eNB. If at least one UE may not be offloaded at a step 1103, the RAH is kept on at a step 1104 and the eNB goes to a step 1106 to check the load on other active RAHs. If all the UEs may be offloaded to other RAHs at the step 1103, the offload is done systematically at a step 1105 and the RAH is switched off. The moving of one UE from one RAH to another is like performing an internal handover between the RAHs of the same eNB. Switching off an RAH consists of switching off the transmitter and the corresponding RF chain of the antenna. The eNB remains operational to control the other RAHs in addition to the central antenna.

Figure 12:
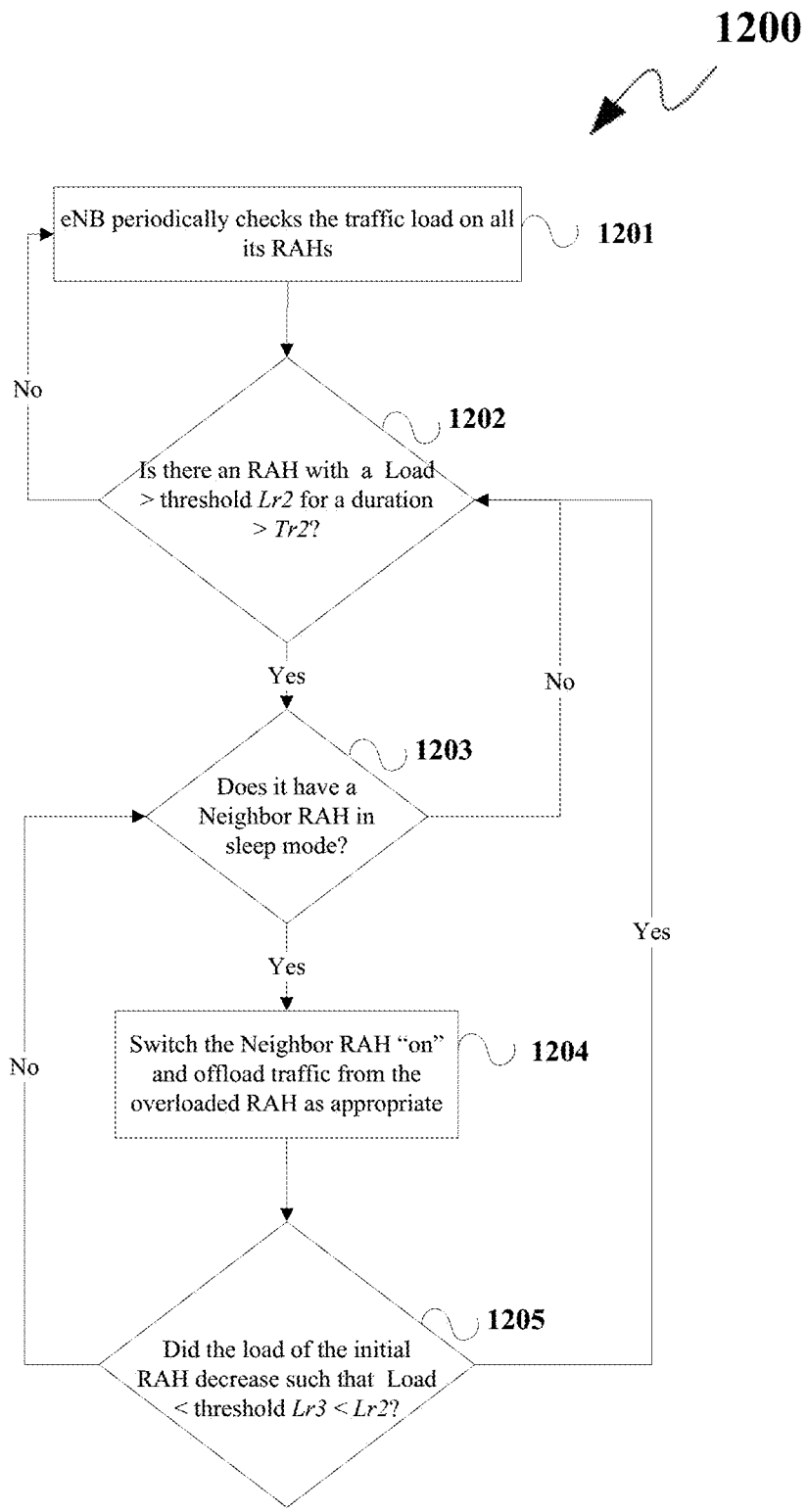
FIG. 12 illustrates a flowchart of a method for RAH Switch ON in the case of DAS implemented at the eNB (BS) to switch ON RAHs, according to an exemplary embodiment of the present invention.

Referring to FIG. 12 which illustrates a flowchart of a method 1200 for RAH Switch on in the case of DAS implemented at the eNB (BS) to switch on RAHs, according to an exemplary embodiment of the present invention. When the traffic load increases, the eNB has to switch on any sleeping RAHs in order to serve the increasing traffic load. The eNB determines the traffic load and the number of UEs associated to each active RAH at a step 1201. If the load on one of the RAHs increased above a certain threshold at a step 1202, the eNB checks if this RAH has an adjacent RAH in sleep mode at a step 1203. If such an RAH is found, the eNB selects one and switches it on to start serving UEs and offloading traffic from the overloaded RAH at a step 1204. The eNB checks then if the load on the overloaded RAH decreased beyond a predefined threshold at a step 1205. If it did, the method 1200 goes to at the step 1202 in order to check for other overloaded RAHs. If none is found the method 1200 goes back to at the step 1201. On the other hand, if the load did not decrease on the loaded RAH at the step 1205, the eNB goes to at the step 1203 to check if it has another neighbor RAH that is switched off in order to switch it on. It may repeat this process until the load is decreased on all RAHs or until all RAHs are switched on.

If, at the step 1203, the eNB finds more than one RAH neighbors are off, the eNB may optimize the selection of the RAH to switch on by implementing at the step 1204 an approach similar to the CoMP approach described in FIG. 8. The eNB may use signals received from other active RAHs and through CoMP signaling with the other eNBs in order to select the best RAH to switch on. Several examples may be considered in FIG. 10 in order to further clarify this approach. In one exemplary embodiment, in FIG. 10, it may be considered that RAHs B0 and C0 are switched off with RAH A0 being on. BS0 is serving UE2 and UE3. In case the load increases in the area that was covered by RAH C0, an increasing number of UEs may be served by CoMP, with the best CoMP pair being BS0 and BS1. Thus, the best RAH to switch on may be RAH C0, which may offload UE2 from the main (central) antenna of BS0. If, after switching on RAH C0, the load continues to increase at BS0, the RAH B0 may be directly switched on, since it is the only RAH of BS0 that has remained off. The UE3 may be offloaded from the central antenna of BS0 to RAH B0.

According to an embodiment of the present invention, DAS functionality may be incorporated in any of the BSs as described in above with respect to HetNet, homogenous macrocell networks, and homogenous small cell networks embodiments. The MBS or the SCBS in HetNet embodiment may be equipped with multiple RAHs, and coverage or capacity BSs in the homogenous macrocell networks embodiments and homogenous small cell networks embodiments may also be equipped with multiple RAHs. The BS switch off procedure described in FIGS. 5 and 6, and the switch on procedure described in FIGS. 7-9, may be implemented on BSs equipped with DAS, as summarized in the flowchart of FIG. 13.

Figure 13:
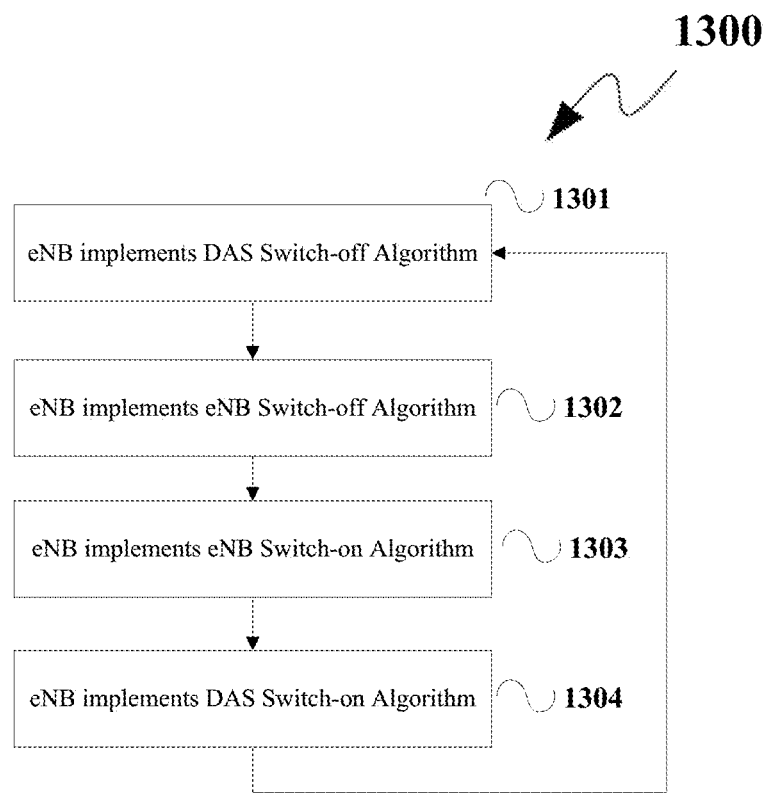
FIG. 13 illustrates a method for eNB/RAH Switch ON/OFF in the case of DAS implemented at the eNB (BS), according to an exemplary embodiment of the present invention.

Referring to FIG. 13 which illustrates a method 1300 for eNB/RAH Switch on/off in the case of DAS (eNB/RAH off/on switching order and iterations) implemented at the eNB (BS), according to an exemplary embodiment of the present invention. The method comprises switching off the RAHs at a step 1301, implementing at least one of the above described BS on/off switching methods on the central BS itself at a step 1302. The decision for switching RAHs on and off is done by each BS independently according to the methods 1100 and 1200, whereas the decision for switching BSs on and off is done by the Coverage BSs to switch Capacity BSs on and off according to the methods 500, 600, 700, 800, 900. Hence, the BS switch on takes place at a step 1303, and the active BS independently handles switching on its sleeping RAHs at a step 1304.

In an exemplary embodiment, the present invention is capable of being implemented in the case of Relays. The relay implementation embodiment is similar to above described embodiment of FIGS. 11 to 13 related to DAS with the exception that relays are connected wirelessly to the central BS, and contain additional intelligence beyond being simple remote antennas with their accompanying RF circuitry.

In the relay implementation embodiment, the switch off method may still be represented by the flowchart shown in FIG. 11, while replacing, systematically in FIG. 11, the term "RAH" by "Relay". The switch on process for this embodiment may still be represented by the flowchart shown in FIG. 12, while replacing, systematically in FIG. 12, the term "RAH" by "Relay". Further, the BS switch off procedure described in FIGS. 5 and 6, and the switch on procedure described in FIGS. 7-9, may be implemented on BSs connected to Relays, as summarized in the flowchart of FIG. 13, while replacing, systematically in FIG. 13, the term "RAH" by "Relay".

A main difference between the Relays embodiment and the DAS embodiment, is that BSs communicate wirelessly with Relays, not over a wired interface. Hence, when a Relay is in sleep mode, its transmitter is switched off, but it needs to maintain basic functionality in its receiver since it still needs to receive a wireless wake up signal form the BS in order to return to active mode.

In another exemplary embodiment, the present invention is also capable of being implemented in "Flat" homogeneous networks. In this embodiment, there is no distinction between coverage and capacity BSs; i.e. there is no hierarchy in which certain BSs may not be switched off whereas other BSs have to be under their control. Therefore, in the figures corresponding to this embodiment, the term eNB refers a BS, wherein eNB=enhanced Node B, which is the standard terminology in LTE/LTE-A. In this embodiment, a BS determines by itself to go into sleep mode or not. However, to wake it up, a command from one of its neighbor BSs has to be received.

Figure 14:
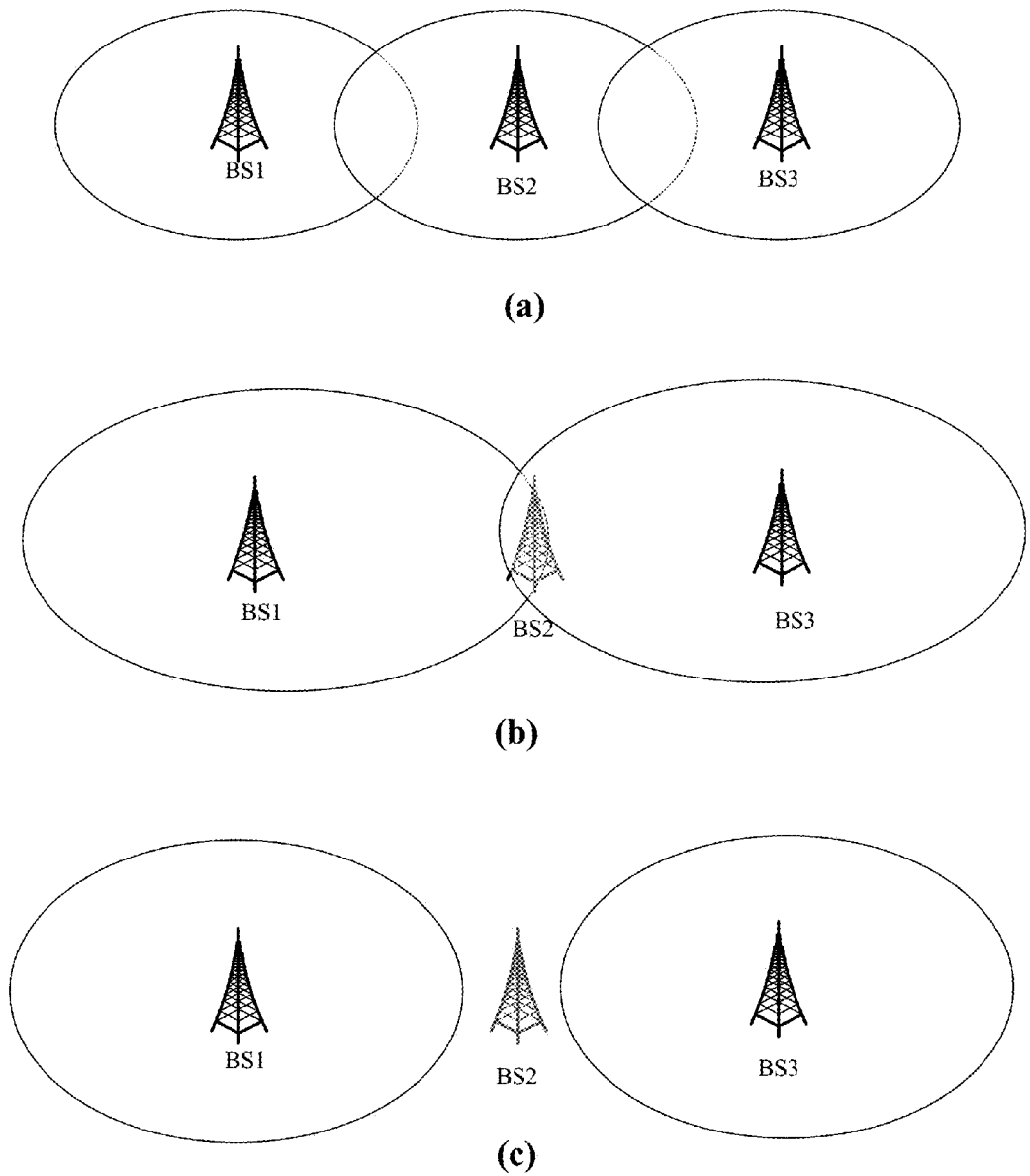
FIG. 14 which illustrate example of three eNBs in flat network architecture, according to an exemplary embodiment of the present invention.

Referring to FIG. 14 which illustrate example of three eNBs in flat network architecture implemented by the present invention to avoid any coverage holes in the switch off process of BSs, according to an exemplary embodiment of the present invention.

FIG. 14(*a*) shows three active eNBs. When a BS2 decides to go into sleep mode, for example, in FIG. 14(*b*), a BS1 and a BS3 may increase their coverage to cover any gaps caused by the switch off of the BS2. This may be done either by increasing their transmit power and/or by using CoMP to increase their effective coverage area, according to methods known to those skilled in the art of cellular network planning. In the example of FIG. 14(*c*), the BS1 and the BS3 may not close the coverage hole caused by the switch off of BS2. Hence, the implementation of the present invention in this embodiment is preferred only in situation where the scenario of FIG. 14(*b*) may be applied.

Figure 15:
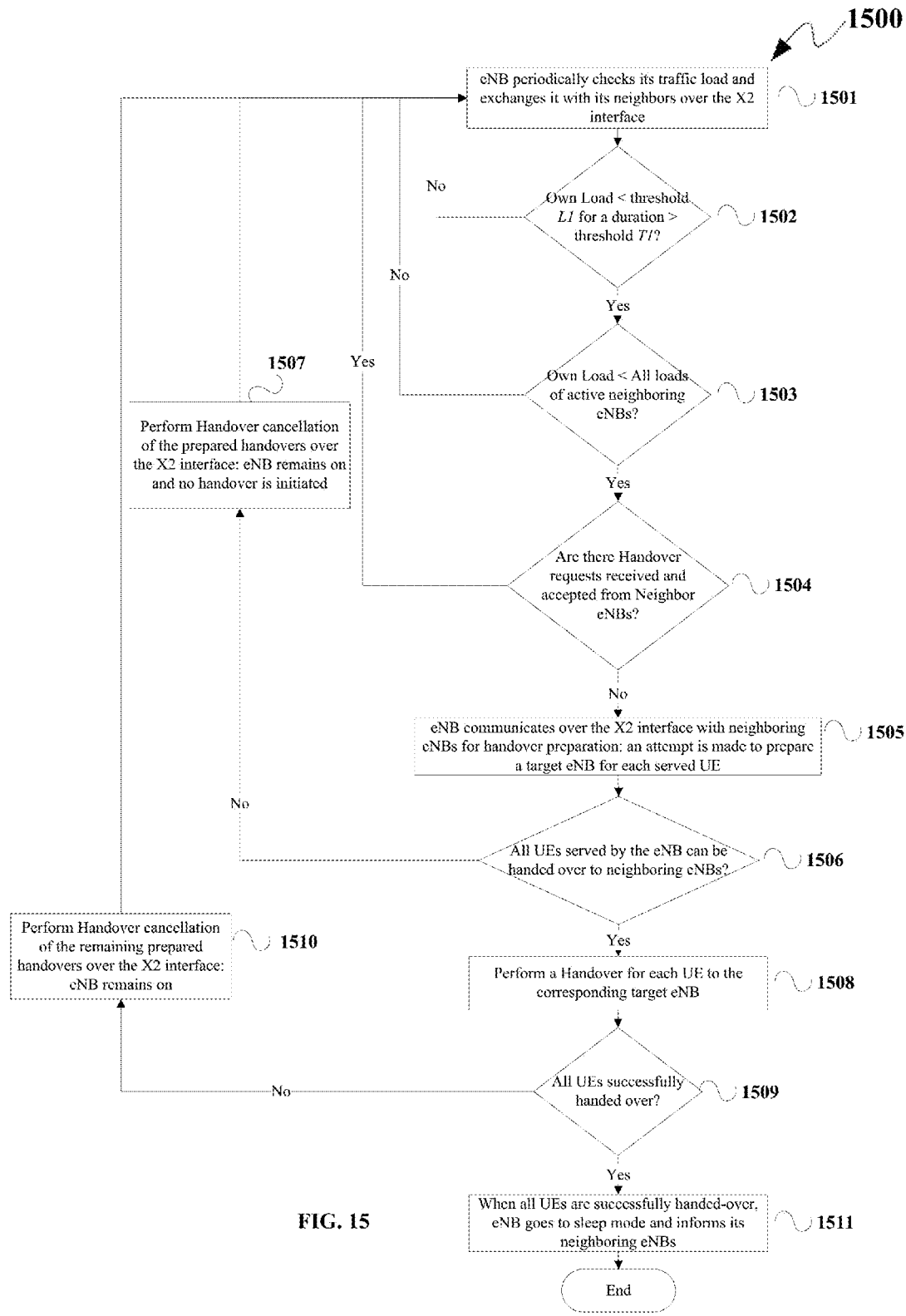
FIG. 15 illustrates a flow chart of a switch OFF method implemented at the eNB (BS) in a flat network scenario to decide to enter in to switched OFF, according to an exemplary embodiment of the present invention.

Referring to FIG. 15 which illustrates a flow chart of a switch off method 1500 implemented at the eNB (BS) in a flat network scenario to decide to enter in to sleep mode, according to an exemplary embodiment of the present invention. The eNBs may exchange traffic load information over the Communication Interface 130 between them, for example, the X2 interface in LTE, during normal network operation at a step 1501. From this exchanged information, the eNB may determine if its load has decreased beyond a certain threshold at a step 1502. If the eNB has the lowest load among its neighbors at a step 1503, the eNB may attempt to initiate the sleep mode process. The eNB may check if there are any handover requests received and accepted from other eNBs at a step 1504. If there are pending requests, the eNB may not be switched off and the method 1500 may return to the step 1501. If no handover requests are pending for UEs to join the eNB, it may attempt to handover its existing UEs (UEs it is already serving) to neighboring eNBs. The eNB may send handover preparation information to neighbor eNBs at a step 1505. The eNB may check if all the handover requests are accepted by the neighbor eNBs at a step 1506.

If at least one request is rejected, the eNB may send handover cancellation requests to cancel the prepared handovers at a step 1507 and remains active and continues operation normally at the step 1501. If all requests are accepted, the eNB may start systematically executing the prepared handovers at a step 1508. In case one of the handovers fails at a step 1509, the eNB may cancel the remaining prepared handovers at a step 1510 and may remain active and continues operation normally at the step 1501. When all the prepared handovers are successfully completed, the eNB may go into sleep mode after informing the neighboring eNBs at a step 1511.

Figure 16:
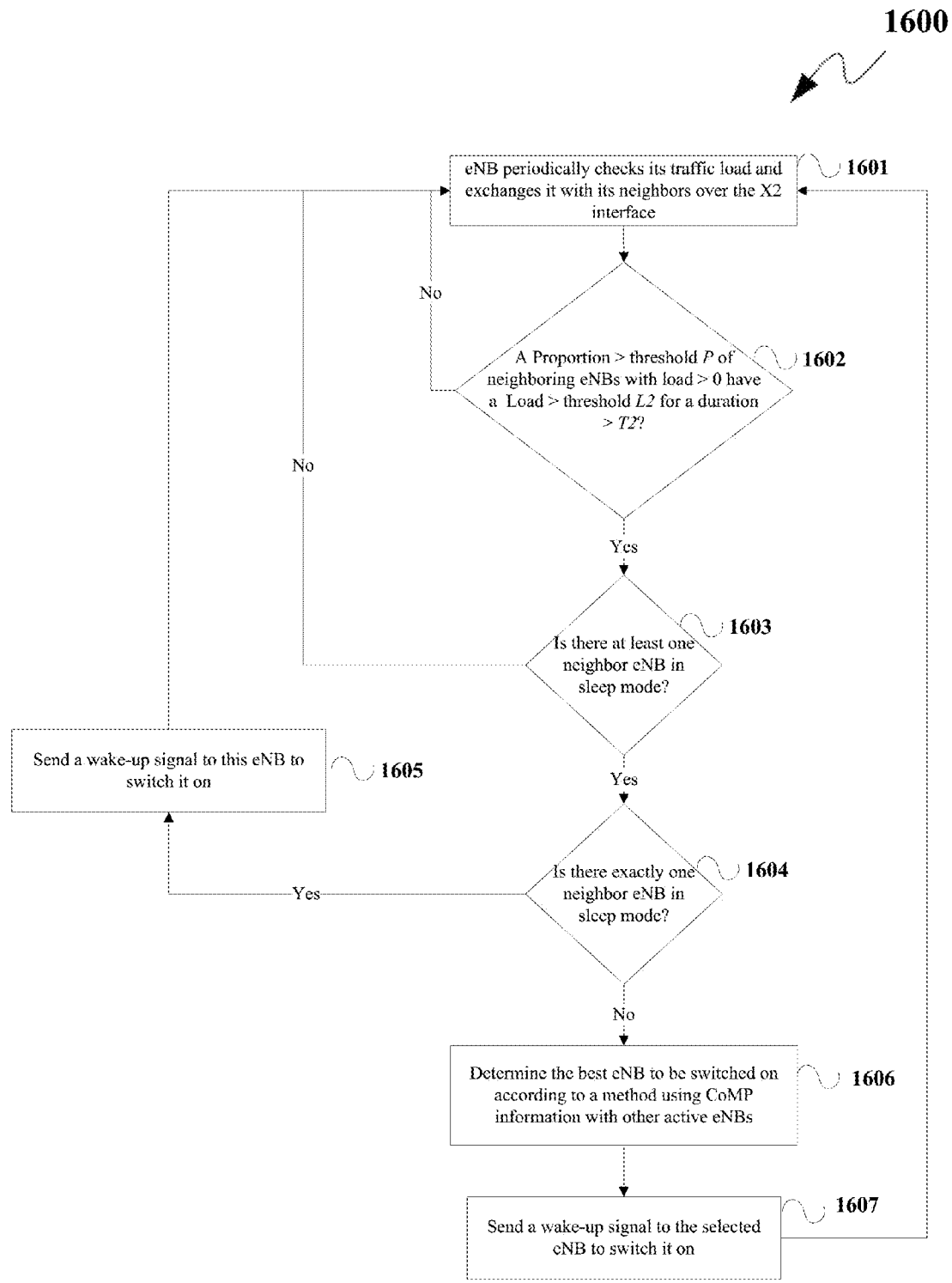
FIG. 16 illustrates a flowchart of a switch OFF method implemented at at least an active eNB (BS) in a flat network scenario to switch ON a sleeping eNB (BS), according to an exemplary embodiment of the present invention.

Referring to FIG. 16 which illustrates a flowchart of a switch OFF method 1600 implemented at at least an active eNB (BS) in a flat network scenario to switch on a sleeping eNB (BS), according to an exemplary embodiment of the present invention. When a number of eNBs may have been switched off, if the traffic starts increasing again in the network, there may be a need to switch on some of them gradually, until the network may serve the connected UEs.

Active BSs exchange traffic load information over the Communication Interface 130 between them during normal network operation at a step 1601. From this exchanged information, an eNB may determine the neighbor eNBs that are switched on, and of which the load increased beyond a certain threshold at a step 1602. In case a load increase is noted beyond target thresholds, the eNB may check its records if the eNB has at least one neighbor eNB in sleep mode at a step 1603. If there is exactly one eNB that was switched off at a step 1604, the active eNB may send the switched off eNB a wake-up signal to switch it on again at a step 1605. If a plurality of eNB are switched off, the active eNB may determine the best one to switch on at a step 1606 using a method 1700 as described in the flow chart of FIG. 17. By determining the sleeping eNB to switch on, the active eNB may send to it a wake up signal at a step 1607, the selected eNB may implement a switch on procedure similar to the one described in the flow chart of FIG. 9, after replacing, in FIG. 9, the term "MBS" by "Active eNB" and the term "SCBS" by the term "Sleeping eNB".

Figure 17:
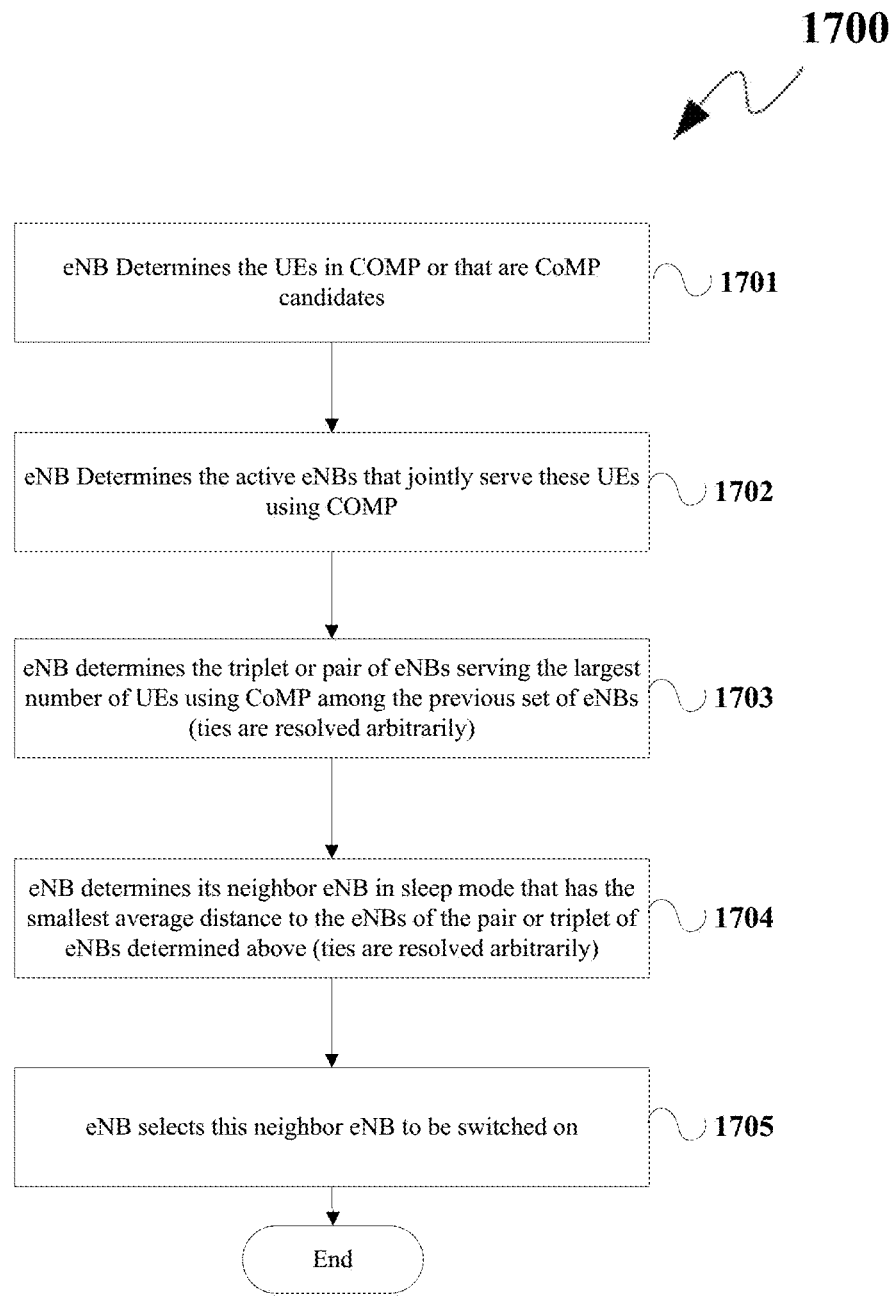
FIG. 17 illustrates a flowchart of a method implemented at at least the active eNB in a flat network scenario to select the best sleeping eNB to switch on using the CoMP signaling information, according to an exemplary embodiment of the present invention.

Referring to FIG. 17 which illustrates a flowchart of a method 1700 implemented at at least the active eNB in a flat network scenario to determine/select the best sleeping eNB to switch on using the CoMP signaling information, according to an exemplary embodiment of the present invention. When the load in the network increases on the active eNBs, several UEs may be served simultaneously by multiple eNBs using the CoMP technique, particularly cell edge UEs. The CoMP technique is also applied by active eNBs in order to maintain the energy savings of the network by allowing the switched off BSs to remain in sleep mode.

The present invention is capable of using the information exchanged to prepare and/or maintain CoMP connections in order to determine the best sleeping eNB to switch on. The active eNB may start first by determining the number of UEs that are served using CoMP or that are CoMP candidates at a step 1701, i.e., to which CoMP signaling has been exchanged with other active eNBs in order to initiate CoMP transmissions. Through this exchanged information, the active eNB may determine the active eNBs that are jointly serving UEs with it using CoMP at a step 1702. In practice, a group (generally two or three) eNBs may be selected to serve a given UE using CoMP. Hence, serving eNBs may generally be either pairs or triplets, however, more than three serving eNB may be adapted.

The active eNB may determine at least the pair or triplet of eNBs serving the largest number of UEs using CoMP at a step 1703. In case more than one pair or triplet is serving the same number of UEs, ties are resolved arbitrarily and any of the pairs/triplets that are serving the largest number of UEs may be selected. The active eNB may determine the neighboring eNB that is in sleep mode and that has the smallest average distance to the eNBs of the selected pair/triplet at a step 1704, and may select this sleeping eNB to be switched on at a step 1705. Again, here, ties are resolved arbitrarily in case more than one eNB in sleep mode has the same average distance to the most loaded CoMP pair/triplet.

Several examples may be considered in FIG. 3 in order to further clarify this approach. In one example of FIG. 3, when eNBs 2-7 are switched off, if a significant number of UEs are connected to eNB 1 as is the case of UE1, and receiving data via CoMP from other eNBs 18 and 19 or eNBs 8 and 19, then eNB 7 may be switched on to offload some of the traffic. In another example of FIG. 3, corresponding to UE2, if a significant number of UEs are connected to eNB 1 receiving data via CoMP from other eNBs 17 and 18 or eNBs 16 and 17, then eNB 6 may be switched on to offload some of the traffic. The number of UEs shown in FIG. 3 are for illustrative purposes, and generally a significantly larger number is needed to exceed load thresholds.

In another exemplary embodiment, the present invention is capable of being implemented in a dynamic coalition formation between BSs. In coalition formation between BSs, the BSs may form coalitions with each other and act in the interest of the whole coalition. Coalitions are generally formed such that a payoff of a BS in a coalition may be higher than when it acts individually. The payoff may be any utility function including energy efficiency, QoS, a combination of both in addition to other parameters etc.

The present invention is described in a hierarchical framework in HetNet, homogenous macrocell networks, and homogenous small cell networks embodiments where a coverage BS controls the on/off switching process of capacity BSs within its coverage area. The association between the capacity BSs and their controlling coverage BS in HetNet, homogenous macrocell networks, and homogenous small cell networks embodiments, is predefined by the network operator, and may be implemented via a self configuration mechanism of the network. This may be considered as a "pre-defined coalition" where the association of capacity BSs to the corresponding coverage BS is fixed. With dynamic coalition formation, coalitions may be continuously formed and broken based on various criteria in a self organizing manner.

The present invention may be implemented with any coalition formation method, as long as the BSs within the coalition may elect a coverage BS at a given instant to perform the on/off switching process. Thus, a coverage BS 110 at a certain time period may become a capacity BS 120 in another coalition at another time period. The present invention may be used in conjunction with coalition formation in order to achieve energy efficiency. At a given instant where certain BS coalitions are formed, the invention may be implemented as described in the HetNets embodiment if the coalition involves HetNets, as described in homogenous macrocell networks embodiment if the coalition involves only MBSs, and according to homogenous small cell networks embodiment if the coalition involves only SCBSs.

The present invention is distributed and compliant with current standards, while being scalable and easily extendable in case of future enhancements of these standards. It is completely transparent to the UEs. The intelligence is included in the BSs, which may operate and coordinate with each other without exchanging additional information with each other and with the UEs beyond of what is currently implemented in existing standards. If additional enhancements and information exchange methods are implemented in future networks, they may be gracefully incorporated in the present invention in order to reach a better performance.

Although, the exemplary embodiment of the present invention is described with LTE-A, but it may apply to other networks. The coordination needed in the present invention is in compliance with the information exchanged between BSs over the X2 interface in the LTE-A standard. This information (exchanged over the X2 interface) includes Intra LTE-Access-System Mobility Support for UE in LTE_ACTIVE, load management, inter-cell interference coordination, general X2 management and error handling functions, and trace functions. The information exchanged over the X2 interface is extracted from the specification document 3GPP TS 36.420 in the LTE standard and incorporated herein under for reference, where the term enhanced Node B (eNB) is the standard term for a BS; E-UTRAN=Enhanced UMTS Terrestrial Radio Access Network; EPC=Evolved Packet Core; LTE_ACTIVE corresponds to the set of active UEs connected to the network.

The Intra LTE-Access-System Mobility Support for UE in LTE_ACTIVE function allows the eNB to handover the control of a certain UE to another eNB. Context transfer from source eNB to target eNB: This function allows transferring information required to maintain the E-UTRAN services for an UE in LTE_ACTIVE from source to target eNB. Control of user plane tunnels between source eNB and target eNB function allows establishing and releasing tunnels between source and target eNB to allow for data forwarding. Handover cancellation function allows informing an already prepared target eNB that a prepared handover may not take place. It allows releasing the resources allocated during a preparation.

Load Management function allows exchanging overload and traffic load information between eNBs, such that the eNBs may control the traffic load appropriately. General X2 management and error handling functions allow for managing of signalling associations between eNBs, surveying X2 interface and recovering from errors. Error indication function may allow the reporting of general error situations on application level. Trace functions may allow trace recording sessions on eUTRAN interfaces for a particular UE is initiated by the EPC. The trace initiation information may also be propagated to the Target eNB during handover, attached to certain handover messages on X2.

Inter-cell Interference Coordination function allows keeping inter-cell interference under control. For this neighbouring eNBs exchange appropriate information allowing that eNBs make radio resource assignments such that interference is mitigated. Uplink Interference Load Management function allows indicating an uplink interference overload and resource blocks especially sensitive to inter-cell interference between neighbouring eNBs, such that neighbour eNBs may co-ordinate with each other such that the mutual interference caused by their uplink radio resource allocations is mitigated.

The present invention considers CoMP signaling to determine which BS to switch on, considers a hierarchical structure in HetNets to avoid coverage gaps during switch-off, and presents embodiments suitable for distributed antenna systems and also for networks where all BSs are of similar structure ("flat" networks as opposed to "hierarchical" networks).

According an embodiment of the present invention, all types of BSs (whether coverage or capacity BSs) are interconnected via the X2-interface for achieving the objective of distributing the intelligence amongst the base-stations in LTE in order to speed up the connection set-up and reduce the time required for a handover. The "hierarchy" aspect with the present invention is in allowing the control of on/off switching of capacity BSs by the coverage BSs.

The present invention may be implemented independently at each coverage BS and the corresponding capacity BSs within its coverage area with coordination needed only with BSs in neighboring coverage areas. The present invention may be implemented in large networks without increased overhead.

The present invention is flexible in terms of the definition of sleep mode in the existing prior art. A BS switched-off or in sleep mode may be one where the pilot/beacon signal is transmitted less frequently, or where the RF chain of some or all the antennas are switched off, or where all the BS is shutdown completely. In this latter case, the BS may be able only to receive a triggering wake-up signal from another BS in order to be switched on again.

The present invention is flexible in terms of the definition of network load. The network load may be in terms of occupied resource blocks (RBs) in LTE terminology or number of wireless channels available at the BS in general or the number of UEs connected to the BS or the number of packets in the BS buffer, etc.

The present invention is applicable without modifications with planned future enhancements/additions to cellular network standards, such as machine-type communication (MTC) or equivalently machine-to-machine (M2M) communications and device-to-device (D2D) communications that may be included in new releases of LTE-A. The present invention may be built as a software module inside the BSs implementing the on/off switching algorithms.

The techniques, devices, subsystems and methods described and illustrated in the various exemplary embodiments as discrete or separate may be combined or integrated with other systems, modules, techniques, or methods without departing from the scope of the present technology. Other items shown or discussed as directly coupled or communicating with each other may be coupled through some interface or device, such that the items may no longer be considered directly coupled to each other but may still be indirectly coupled and in communication, whether electrically, mechanically, or otherwise, with one another. Other examples of changes, substitutions, and alterations ascertainable by one skilled in the art, upon studying the exemplary embodiments disclosed herein, may be made without departing from the spirit and scope of the present technology.

Moreover, those skilled in the art will appreciate that the means and functions explained herein above may be implemented using software functioning in conjunction with a programmed microprocessor or general purpose computer, and/or using an application specific integrated circuit (ASIC). It will also be appreciated that while the current invention is primarily described in the form of methods and devices, the invention may also be embodied in a computer program product as well as a system comprising a computer processor and a memory coupled to the processor, wherein the memory is encoded with one or more programs that may perform the functions disclosed herein.

It should be noted that reference throughout this specification to features, advantages, or similar language does not imply that all of the features and advantages should be or are in any single embodiment. Rather, language referring to the features and advantages may be understood to mean that a specific feature, advantage, or characteristic described in connection with an embodiment may be included in at least one embodiment of the present technology. Thus, discussions of the features and advantages, and similar language, throughout this specification may, but do not necessarily, refer to the same embodiment.

What is claimed is:

1. A method for dynamically switching at least a base station in ON/OFF mode in a cellular network, the method comprising:

determining traffic load information of at least a capacity BS and at least a coverage BS;

exchanging the traffic load information with at least a neighboring coverage BS and at least a neighboring capacity BS;

determining at least a preferred capacity BS for one of a switched OFF mode and a switched ON mode, wherein the preferred capacity BS is one of the capacity BS and a neighboring capacity BS corresponding to the coverage BS; and switching the preferred capacity BS in to one of the switched OFF mode and the switched ON mode to meet traffic load requirement of the cellular network by implementing a switching method at at least the capacity BS, the switching method comprising:

exchanging traffic load information between at least the coverage BS, the capacity BS, the neighboring coverage BS, and the neighboring capacity BS;

receiving at least a switched OFF mode request from the coverage BS;

attempting to handover an user equipment to at least one of the neighboring coverage BS and the neighboring capacity BS;

sending handover preparation information to at least one of the neighboring coverage BS and the neighboring capacity BS;

checking whether all handover requests are accepted by at least one of the neighboring coverage BS and the neighboring capacity BS;

sending handover cancellation requests to at least one of the neighboring coverage BS and the neighboring capacity BS to cancel the prepared handovers if at least one handover request is rejected;

informing the coverage BS of a failure of a switch OFF mode process and continuing operation normally;

executing systematically prepared handovers if all handover requests are accepted;

canceling remaining prepared handovers and informing the coverage BS of the failure of the switch OFF mode process in case if at least one handover fails; and sending the capacity BS into the switched OFF mode after informing the coverage BS of success of an operation if all the prepared handovers are successfully completed, wherein a master controller is capable of implementing at least a determining method for determining at least the preferred capacity BS for one of the switched OFF mode and the switched ON mode, wherein a slave controller is capable of implementing at least the switching method, and wherein coordinated multipoint (CoMP) information with at least one of the coverage BS, the capacity BS, and the neighboring coverage BS is used to determine the preferred capacity BS to be switched ON.

2. The method of claim 1, wherein switching the preferred capacity BS in to the switched OFF mode comprising handing at least the user equipment from the preferred capacity BS to at least one of the capacity BS, the coverage BS, and the neighboring coverage BS before going to switched OFF mode.

3. The method of claim 2, wherein switching the preferred capacity BS in to the switched OFF mode comprising keeping the capacity BS switched ON and informing its status to at least one of the coverage BS, the neighboring capacity BS, and the neighboring coverage BS if at least an user equipment connected with the capacity BS remain unhanded.

4. The method of claim 1, wherein switching the preferred capacity BS in to the switched ON mode comprising handing at least the user equipment within service area of the preferred capacity BS from one of the capacity BS, the coverage BS, and the neighboring coverage BS to the preferred capacity BS which is now in switched ON mode.

5. The method of claim 4, wherein at least the user equipment in the service area of the preferred capacity BS was served by at least one of the capacity BS, the coverage BS, and the neighboring coverage BS during the switched OFF mode of the preferred capacity BS.

6. The method of claim 1, wherein the determining method is implemented at at least the coverage BS to determining at least the preferred capacity BS for switching OFF mode comprising:

exchanging traffic load information between at least the coverage BS, the capacity BS, the neighboring coverage BS, and the neighboring capacity BS through a communication interface;

determining at least the preferred capacity BS whose traffic load is decreased beyond a certain threshold; and switching at least the preferred capacity BS in the switched OFF mode.

7. The method of claim 1, wherein the determining method is implemented at the coverage BS for determining at least the preferred capacity BS for switching ON mode comprising:

exchanging traffic load information over the communication interface between a plurality of active BSs during normal network operation, wherein active BS includes at least the coverage BS, the capacity BS in switched ON mode, the neighboring coverage BS, and the neighboring capacity BS in switched ON mode;

determining at least an active BS of which a traffic load is increased beyond a certain threshold or if the active BS itself supporting a load beyond a certain threshold;

checking records of the coverage BS to determine if it has set at least one capacity BS into switched OFF mode in case a load increased beyond target thresholds;

sending at least a wake-up signal to at least the capacity BS for switching the capacity BS in switched ON mode;

determining at least a preferred capacity BS for switched ON mode if a plurality of capacity BSs are in switched OFF mode;

sending a wake up signal to at least the capacity BS after determining the capacity BS to be in switched ON mode; and implementing a BS selection method for selecting at least the preferred capacity BS for switched ON mode.

8. The method of claim 7, wherein the BS selection method is implemented at at least the coverage BS comprising:

determining number of user equipments that are served using coordinated multipoint (CoMP) or that are coordinated multipoint (CoMP) candidates;

determining a plurality of active BSs that are jointly serving the user equipments with the coverage BS using the CoMP;

determining a group of active BSs serving a largest number of user equipments using the CoMP among a previous set of active BSs, wherein at least the coverage BS is a member of the group;

determining at least a capacity BS within coverage of the coverage BS that is in switched OFF mode and that has a smallest average distance to the active BSs of the group; and selecting at least the capacity BS to be in switched ON mode,
wherein ties are resolved arbitrarily in case a plurality of capacity BS are in switched OFF mode have the same average distance to the most loaded CoMP group BSs.

9. The method of claim 1, wherein the switching method for switching the capacity BS in switched ON mode is implemented at capacity BS comprising:
receiving switched ON signal from the coverage BS;
attempting to send at least the capacity BS in the switched ON mode;
sending an indication to the coverage BS indicating a failure of the switched ON mode operation and to remain in switched OFF mode if the process of attempting to send at least the capacity BS in the switched ON mode fails;
starting operation of the capacity BS if the process of attempting to send at least the capacity BS in the switched ON mode is successful;
serving user equipments within range of the capacity BS which is in the switched ON mode;
communicating with at least one of the neighboring capacity BS and the coverage BS for handover preparation for the user equipments that the switched ON mode capacity BS serves; and
executing handovers of the user equipments in coordination with at least one of the neighboring coverage BS and the capacity BS,
wherein if a plurality of capacity BSs are in switched OFF mode and if the traffic starts increasing again in the cellular network then at least some of the plurality of capacity BS are switched ON gradually until the cellular network serves all connected user equipments.

10. A System for dynamically switching ON/OFF at least a base station in a cellular network, comprising:
at least a coverage BS adapted in switched ON mode for ensuring uninterrupted cellular coverage over a given area, the coverage BS comprising
a master controller incorporating at least a determining module for determining at least a preferred capacity BS for one of a switched OFF mode and a switched ON mode;
at least a capacity BS adapted to be in one of the switched ON mode and the switched OFF mode depending on network conditions and to satisfy cellular traffic loads, the capacity BS comprising
a slave controller incorporating at least a switching module for dynamically switching at least the preferred capacity BS in to one of the switched OFF mode and the switched ON mode; and
at least a communication interface adapted to provide interface between at least the coverage BS and the capacity BS,
wherein the switching module is capable of
exchanging traffic load information between at least the coverage BS, the capacity BS, a neighboring coverage BS, and a neighboring capacity BS,
receiving at least a switched OFF mode request from the coverage BS,
attempting to handover an user equipment to at least one of the neighboring coverage BS and the neighboring capacity BS,
sending handover preparation information to at least one of the neighboring coverage BS and the neighboring capacity BS,
checking whether all handover requests are accepted by at least one of the neighboring coverage BS and the neighboring capacity BS,
sending handover cancellation requests to at least one of the neighboring coverage BS and the neighboring capacity BS to cancel the prepared handovers if at least one handover request is rejected,
informing the coverage BS of a failure of a switch OFF mode process and continuing operation normally,
executing systematically prepared handovers if all handover requests are accepted,
canceling remaining prepared handovers and informing the coverage BS of the failure of the switch OFF mode process in case if at least one handover fails, and
sending the capacity BS into the switched OFF mode after informing the coverage BS of success of an operation if all the prepared handovers are successfully completed,
wherein the ON/OFF switching is performed dynamically in a distributed way while using information exchanged between BSs and user equipments (UEs) on an air interface, and between various BSs on the communication interface without any localization information about the user equipments (UEs) in the cellular network.

11. The system of claim 10, wherein the slave controller is configured to control switched ON mode and switched OFF mode operations of the capacity BS based on commands received from the master controller.

12. The system of claim 10, wherein the communication interface is capable of facilitating the exchange of handover information, load management information, and information for coordinated transmission to a given user equipment by the BSs.

13. The system of claim 10, wherein in homogeneous macrocell networks the coverage BSs increase their coverage when a capacity BS is switched OFF in order to cover the coverage gaps caused by the switch OFF process.

14. The system of claim 10, wherein in homogeneous small cell networks the coverage BSs increase their coverage when a capacity BS is switched OFF in order to cover the coverage gaps caused by the switch off process.

15. The system of claim 10, wherein in flat networks the capacity BS takes the decision to switch itself OFF without a command from the coverage BS and informs its neighbor capacity BS who increase their coverage area to close coverage gaps after the switch OFF.

16. The system of claim 10, wherein the switched OFF mode includes at least one of the capacity BS switched-OFF, a pilot/beacon signal is transmitted less frequently, a RF chain of some or all the antennas are switched OFF, all the capacity BS is shutdown completely.

17. The system of claim 10, wherein the capacity BS is able only to receive a triggering wake-up signal from the coverage BS in order to be in switched ON mode again if the capacity BS is shutdown completely.

18. The system of claim 10, wherein switch ON operation uses CoMP information that is exchanged between active BSs during normal network operation in order to determine the best BS for switched ON mode.

19. The system of claim 10, wherein in a dynamic BS coalition formation method the coverage BSs and capacity BSs are periodically redefined depending on the changing membership of a BS in different coalitions, wherein each coalition elect a BS to control switching processes of the switched ON mode and the switched OFF mode within a coalition.

* * * * *